United States Patent [19]

Schwartz

[11] Patent Number: 4,539,106

[45] Date of Patent: Sep. 3, 1985

[54] SYSTEM AND APPARATUS FOR WATER CONDITIONING

[75] Inventor: Arthur G. Schwartz, Phoenix, Ariz.

[73] Assignee: Charles E. Cates, Phoenix, Ariz.

[21] Appl. No.: 557,645

[22] Filed: Dec. 2, 1983

[51] Int. Cl.³ .......................... B01J 49/00; C02F 1/42
[52] U.S. Cl. ...................................... 210/88; 210/98; 210/143; 210/190
[58] Field of Search ................... 210/662, 687, 87-89, 210/98, 134, 138, 143, 190, 191

[56] References Cited

U.S. PATENT DOCUMENTS

| | | | |
|---|---|---|---|
| 3,509,998 | 5/1970 | Pellett et al. | 210/191 |
| 3,891,552 | 6/1975 | Prior et al. | 210/190 |
| 4,298,025 | 11/1981 | Prior et al. | 210/190 |

Primary Examiner—Ivars Cintins
Attorney, Agent, or Firm—Charles E. Cates; Victor Myer

[57] ABSTRACT

A water softening system and apparatus utilizes two tanks, one for service and one for regeneration, and a control system operated by soft water flow controls the operation of all valves and the sequences of regeneration. The control system utilizes parallel plate valves for switching from one tank to the next, parallel plate valves energizing the piston moving the switching valves, and a parallel plate valve structure for distributing the regeneration water, as to amount of flow, direction and timing. A two-way to one-way cam structure initiates the operation of a control cylinder which supplies soft water to the metering valve and the regeneration valve as and where needed.

22 Claims, 31 Drawing Figures

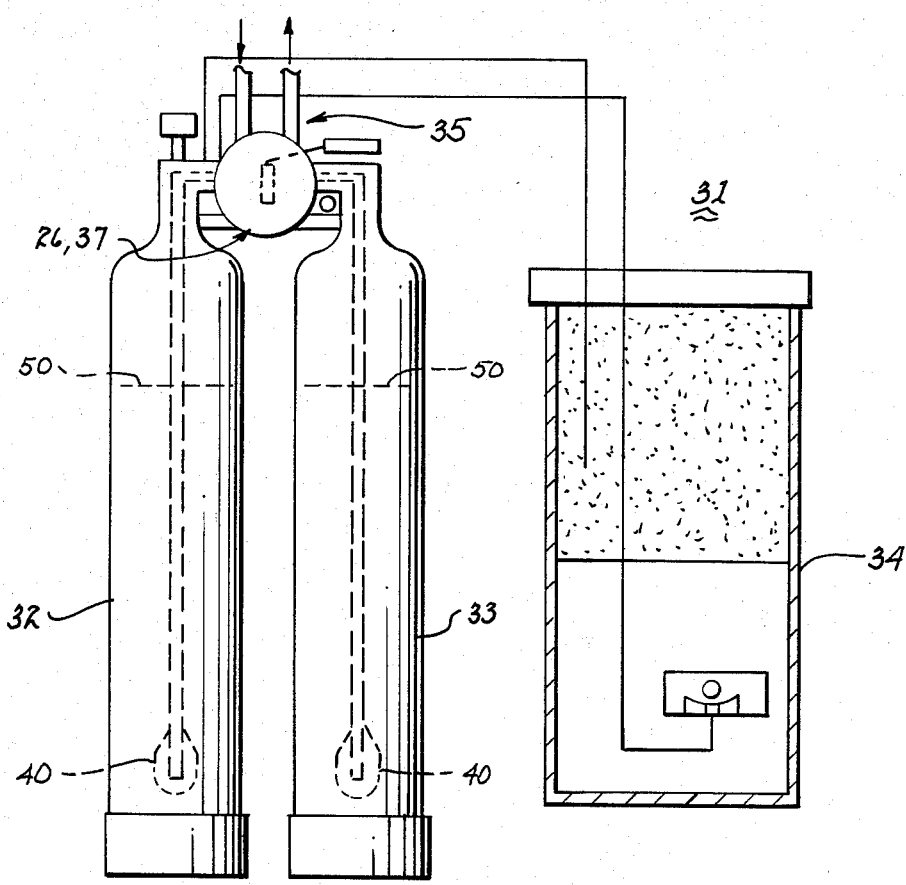
fig. 1
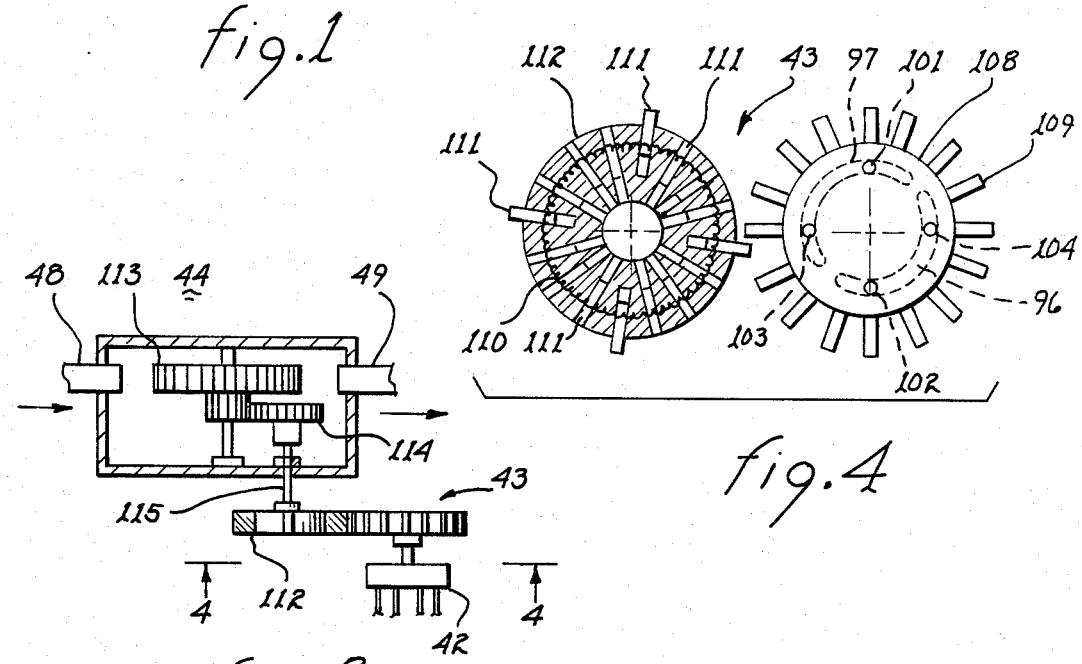
fig. 3
fig. 4

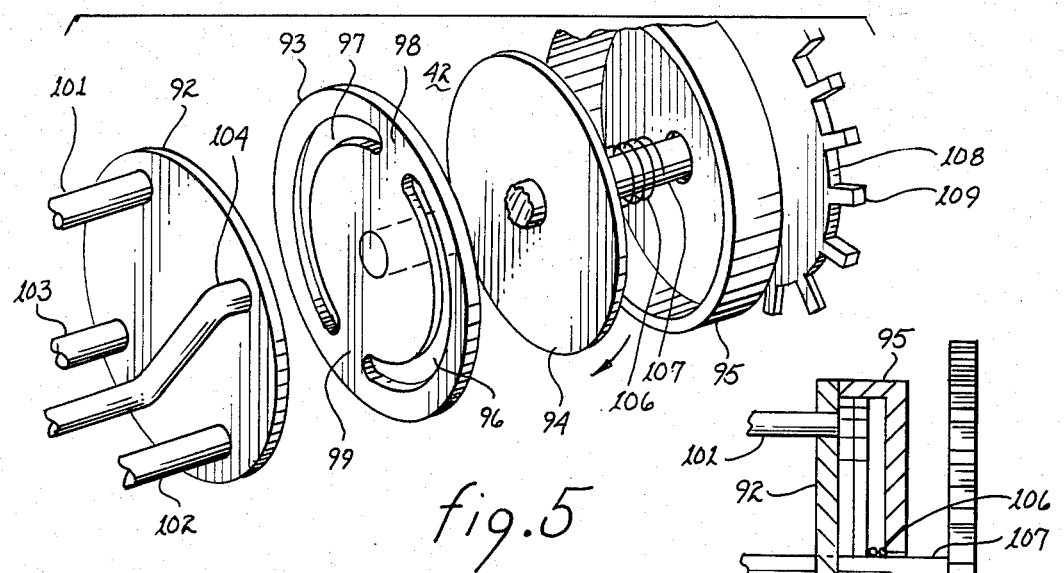
fig.5
fig.6
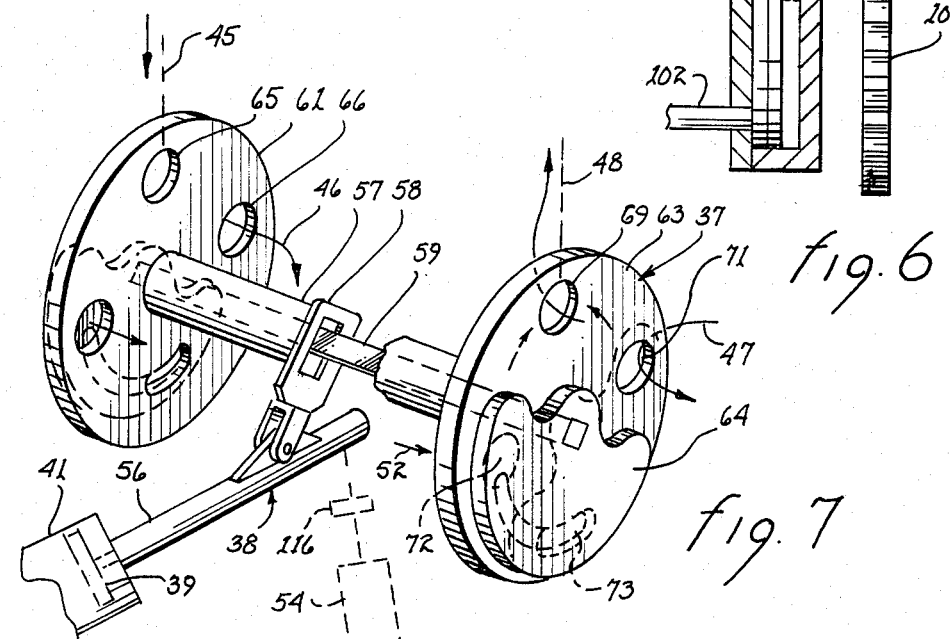
fig.7
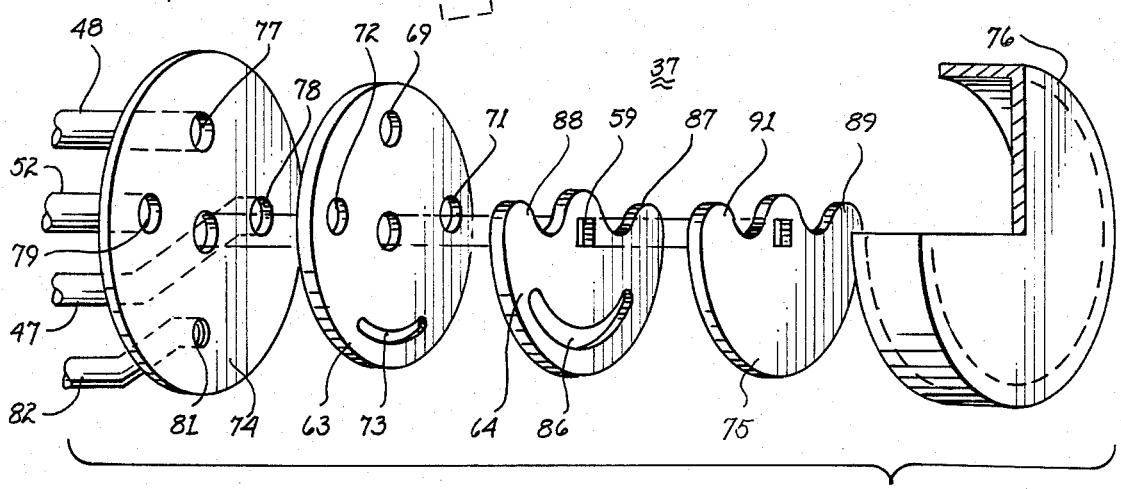
fig.8

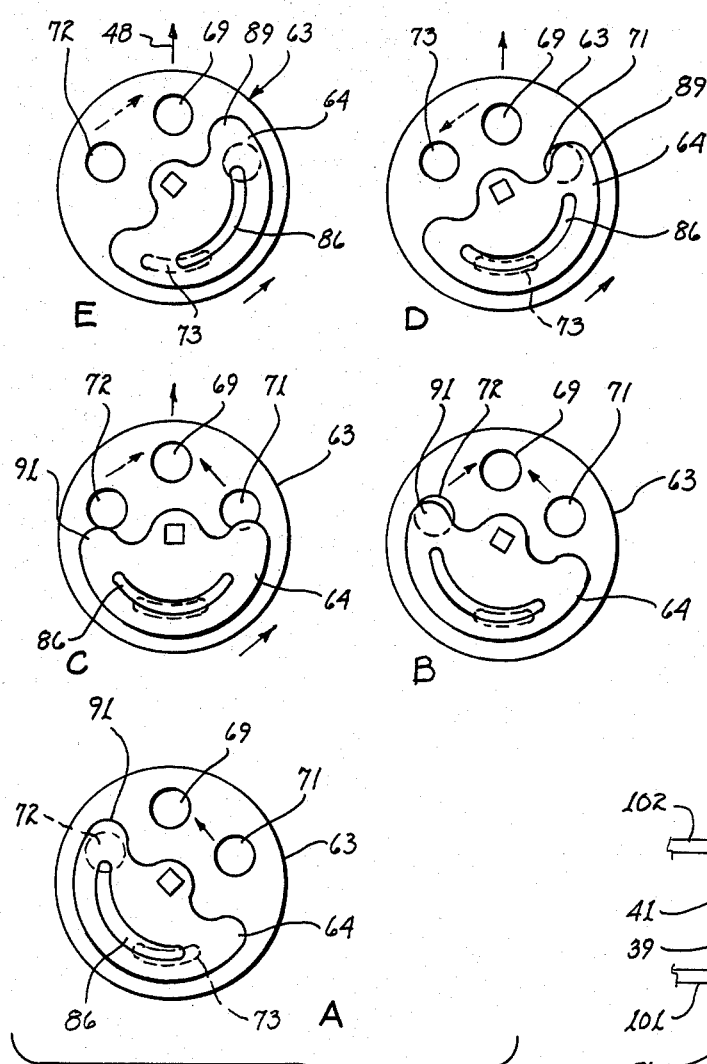
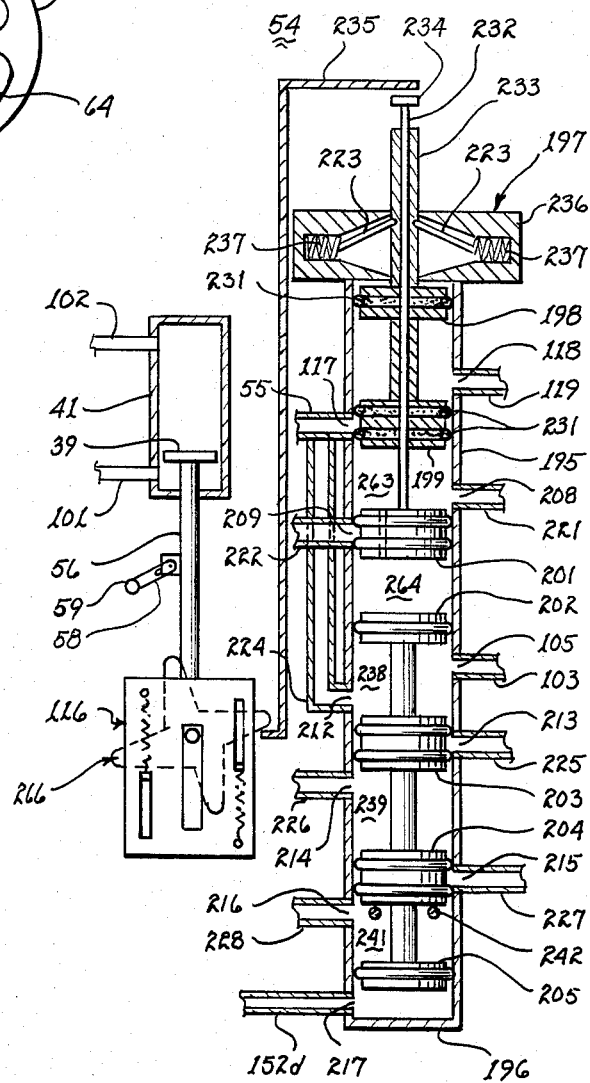
fig. 9
fig. 10

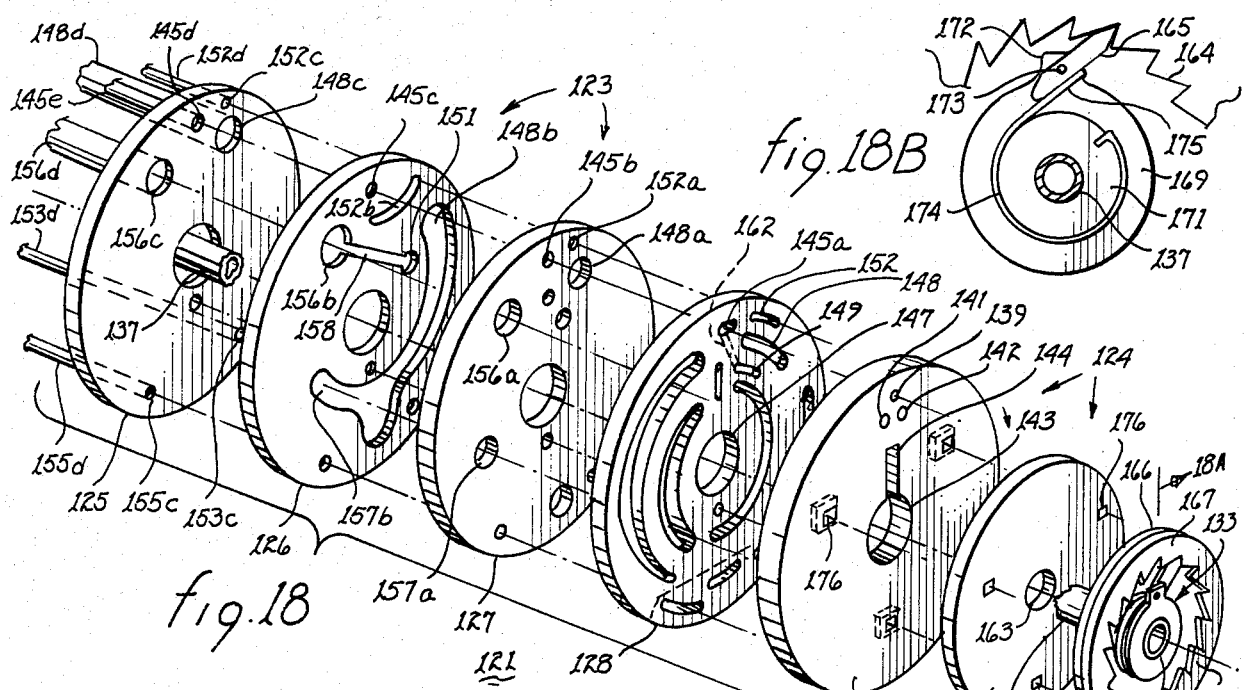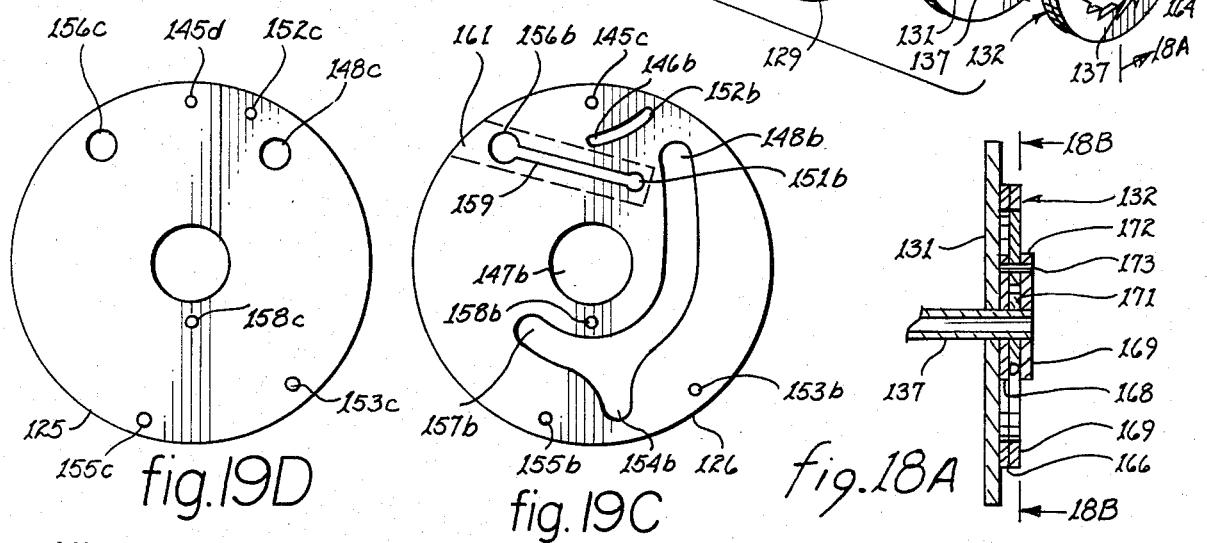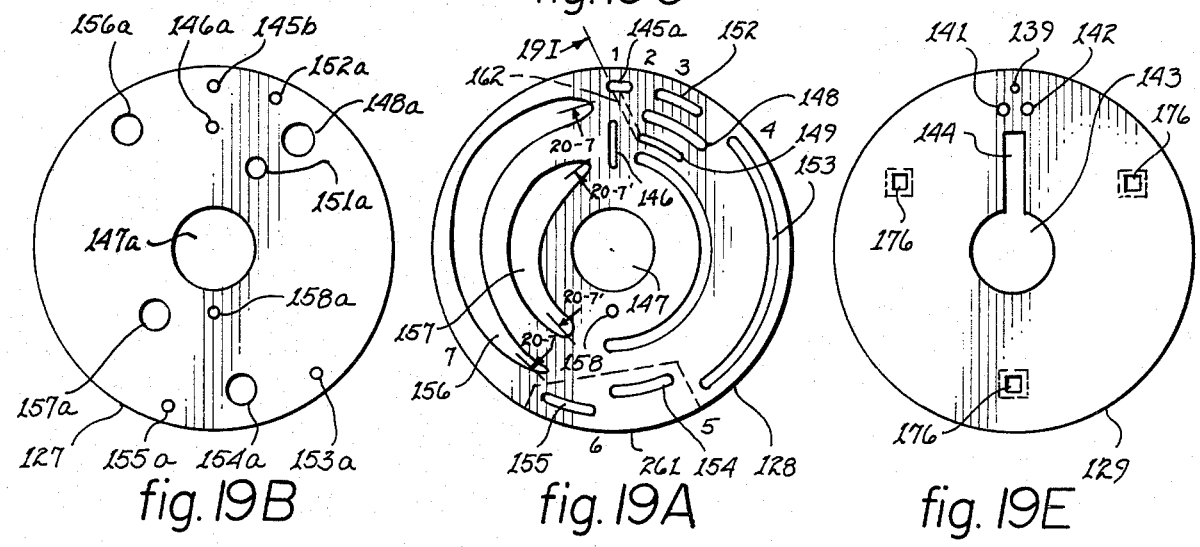

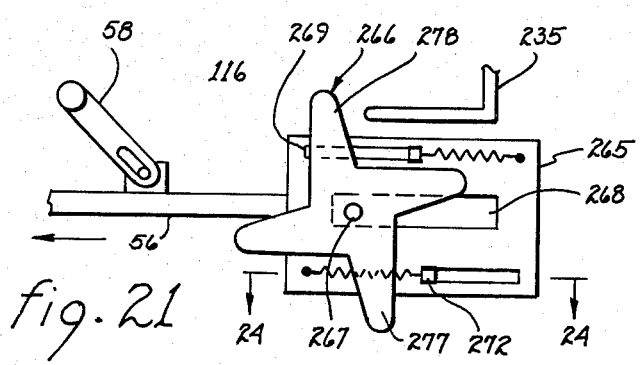
fig. 21
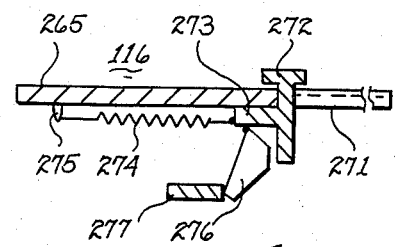
fig. 24
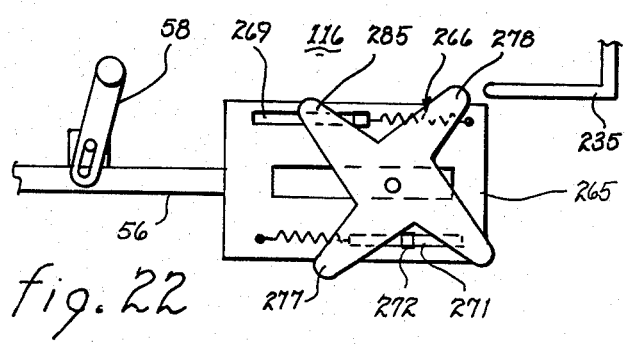
fig. 22
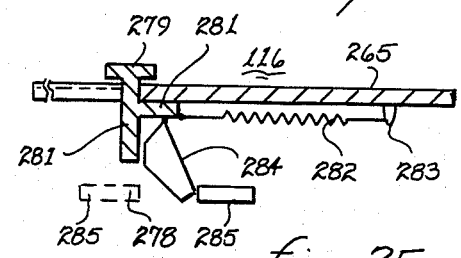
fig. 25
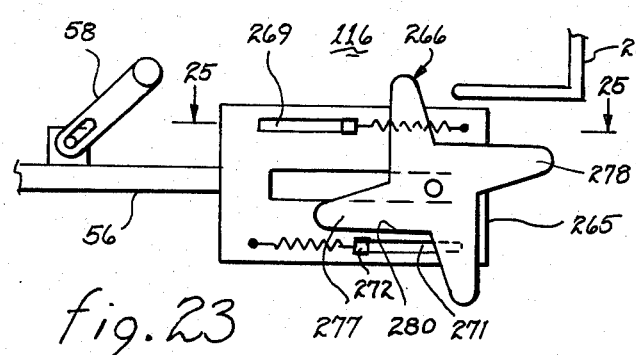
fig. 23
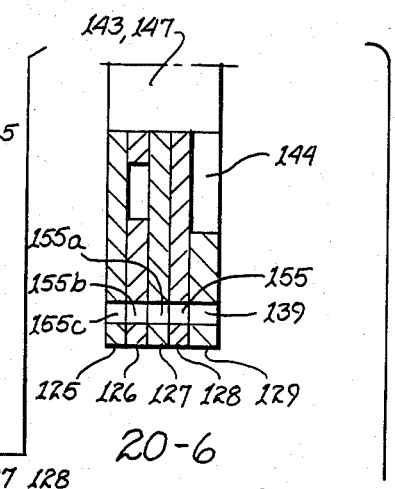
fig. 20 CONT.
20-6
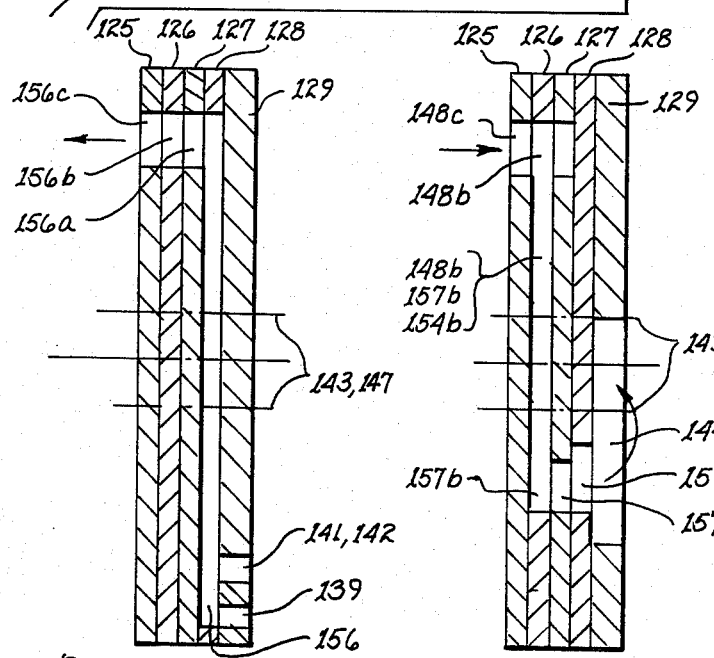
20-7      20-7'
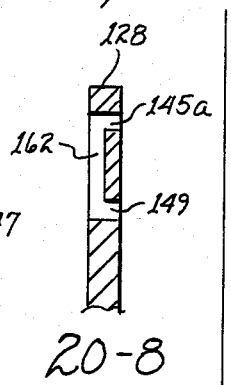
20-8

SYSTEM AND APPARATUS FOR WATER CONDITIONING

BACKGROUND OF THE INVENTION

This invention relates to a system and apparatus for water conditioning, more particularly to such a system and apparatus for water softening for domestic, or industrial, use and it is an object of the invention to provide an improved system and apparatus including components thereof of this nature.

Automatic water softening systems and apparatus in the sense that softened or treated water is continuously available are well-known. In this respect reference may be made to U.S. Pat. No. 3,891,552 Prior et al, issued on June 24, 1975 for Control Valve for Water Softeners. In this patent and in other known systems, it is known to provide two softener tanks associated with a salt and brine supply so that when the water softening capability of one of the tanks is exhausted the system is automatically switched to the second tank which in the meantime has been regenerated. During the subsequent use of the regenerated tank the exhausted tank is recharged or regenerated and it is therefore available when the immediate tank in use has been exhausted.

The prior art water softeners usually are of the ion exchange type in which hard water flows through a recharged tank including a resin or, mineral, which has an abundant supply of soft water ions in it which are exchanged on the surface of the mineral for the hard water ions of the supplying hard water. Hard water ions may be of calcium and/or magnesium typically whereas soft water ions typically are sodium ions. After a certain number of gallons of water have flowed through the tank in use the softening ability of the mineral therein has become exhausted, which is to say there are no longer any soft water or sodium ions available to replace the hard water or calcium or magnesium ions. At this point through some sensing mechanism the exhausted tank is switched out of the user circuit and the waiting recharged (regenerated) tank is switched into the circuit and continues to supply softened water. The exhausted tank is then connected into apparatus for regenerating the exhausted mineral in it. In this process removing, or flushing out, the hard water ions of magnesium and calcium and resupplying the mineral with an inventory of soft water or sodium ions takes place.

Typically, known systems require about one hour, or so, for recharging the exhausted tank while the recharged tank that is in use is capable of supplying an ordinary household with softened water for a period of several days depending upon the amount of use. Thus whenever the tank in use becomes exhausted the regenerated tank is ready to be substituted therefor.

Some well-known prior art systems for softening water for domestic use utilize a single tank in which the water softening mineral is disposed and when the softening effect has been exhausted the mineral in the tank is recharged. During the recharging, or regeneration, cycle the tank is not available for supplying softened water for domestic use because at that point, the water available is hard, or filled with salt, depending upon the phase of regeneration that the tank is in. Water softening cycles or systems of such well-known single tank operations have included upflow or counterflow, backwashing under a substantial rate of flow but at a low enough rate so that the mineral is not flushed out of the tank. Such rapid flow backwashing fluffs the mineral and eliminates any tendency for the rinsing to become channelized and thus inefficient. The upflow or counterflow is opposite to the downflow direction of the water when the tank is in service. Likewise, such prior single tank systems have included brine introduction in a downflow, or service flow, direction at a relatively slow rate of flow in order to introduce the brine as needed and without flushing it through unnecessarily. After the brine has been introduced in the down flow direction at a relatively slow rate a rinse is carried out in the same downflow direction to rinse out the brine that remains after having served its purpose by exchanging soft water ions for the hard water ions. After the slow rate of rinse flow such prior art systems have carried out a fast flow purge also in the down flow direction to eliminate any residue of salt in the mineral. The down flow purge can be at a fast rate because the mineral is being pushed down into the tank and therefore is not subject to being flushed out or lost. The downflow direction is of course the same as the service flow direction. In all of these phases of regeneration the water used is hard water from the supply inasmuch as there is no soft water available for this purpose in any event. This is a serious problem existing with single tank systems along with the fact that the tank is not available for supplying soft water during the regeneration period of one or two hours.

In such prior systems the only phase of regeneration that is conducted with soft water is the brine make-up cycle so that the brine available for the next recharge of the exhausted tank is with soft water brine.

As indicated above, two tank systems are known to the prior art which eliminate certain of the disadvantages of a single tank system. For example, there is no delay in having soft water available when the tank in serivce has to be regenerated because the regenerated tank is there and is placed in service immediately. Also, in such two-tank systems soft water is available for all of the regeneration functions including rinsing, brine introduction, and purging as well as brine formation.

In such two-tank systems the direction of flow in the tank in service is downflow in order to have the flow go against the compacted mineral thereby achieving better contact of the hard water with the mineral and resulting in improved filtering and the like. Such known systems have not included an upflow or counterflow backwash at a relatively strong rate, but have included brine injection at a relatively slow rate in an upflow or counterflow direction and have continued rinsing at the same slow rate for a period of time. The latter is followed by a relatively fast but controlled backwash flow rate in an upflow or counterflow direction so that the mineral is not washed or flushed out of the tank. In such systems the fast backwash rate cannot be as great as the purge or rinse cycle of the single tank apparatus because of this fact. A possibility exists therefor in such known two-tank systems that there may be some residual salt taste in the softened water shortly after the regeneration has taken place.

SUMMARY OF THE INVENTION

This invention relates to improvements in an automatic water softener control valve which maintains continual soft water service by alternating between two softener tanks joined to a common water supply with the option of using a water meter, hardness sensors, solenoids or manual controls to activate transfer from an expended tank to a recharged twin-tank and providing an improved manner of regenerating the expended tank, then holding it in readiness until another cycle is needed. Also, the valve can be adapted to operate on a single resin tank with the option of adding another tank sometime later. When two tanks are utilized soft water from the service tank is used in both upflow and downflow directions to regenerate the idle tank. The amount of refill water for brine make-up is metered, then all pressure to the salt tank is shut off to eliminate overflows, then it provides for a catch-up cycle if usage has been excessive during regeneration.

As a twin-tank control the valve provides all of the following features: continuous soft-water service, day or night, whenever it is needed, completely automatic, without guesswork or complicated programming, regeneration on demand at any time even more than once a day, soft water for regeneration to clean better, no unnecessary salt usage, no dependence on electricity to operate, two-way regeneration-backwash to loosen resin, downflow to purge, metered brine tank refill to eliminate float problems and overflow, adjustable for various degrees of hardness without servicemen, tools or manuals, automatic catch-up regeneration after times of excessive use.

The system achieves the automatic performance of six functions: (1) determine when to regenerate, (2) switch to the other tank, (3) activate regeneration, (4) direct the phases of regeneration, (5) control other functions during regeneration, and (6) stop regeneration. The components for accomplishing these procedures are connected but positioned separately so as to permit the option of using different type controls to rotate the reversing valve which causes the hydraulic cylinder to switch service from one tank to the other. All of the controls are water flow operated. No electrical controls, manual controls or sensors are needed.

The system according to the invention utilizes rotary type valves for directing the phases of regeneration, for switching the tanks from service to regeneration and for timing or measuring the utilization of soft water and activating the mechanism for switching from one tank to the other. No moving seals are needed and only one moving part is needed for each valve. The water's own pressure is distributed across the face of the movable circular or semi-circular plastic plate to hold it tightly against the face of the stationary plate. In this system the only seals needed are gaskets at the points of separation of the encasements and "O" rings where the shafts enter. The rotary valves operate by aligning or closing ports or orifices of one plate with those of the other. Accordingly the valves are maintenance free compared with the other systems. In addition, a control cylinder is provided and is utilized to control the supply of soft water to the various rotary plate valves whereby water pressure is made available only at the point when and where needed thereby avoiding any problems of overflow, lack of flow and the like. Such a control cylinder does not exist in other known systems. Consequently there is no overflow of brine and no cycling during regeneration. A further feature of this system is that the leakage of the control cylinder due to its own malfunctioning tends to close it off, that is to say, it tends to correct its own malfunction.

Accordingly, it is an object of the invention to provide improved automatic water softener control valves, and/or systems as well as providing an improved system of regeneration which substantially eliminates the disadvantages known to the prior art.

The invention provides for a regeneration valve which permits the flow from a source in one direction to variable flows and directions for other purposes while maintaining constant pressure, and regulating it without any moving parts other than one disk. By providing passages and orifices of predetermined size, the right flow takes place without further adjustments. Pressure is regulated by the pressure adjustment across a faceplate valve and a spring tension. If flow does not move fast enough pressure builds up and slows down the plates and it tends to close the control orifices.

Further rapid backwashing as a first step in the regeneration process tends to loosen the resin so that brine can reach all parts thereof, thereby eliminating channeling and it achieves uniform brining. Brining itself is slower than this and also is in an upflow or counterflow direction to achieve a better and more uniform brining. Further rapid backwash in an upflow direction but still controlled so that brine is not flushed out tends to break up pockets of brine which formed in the mineral mass and thus enables the brine to be washed or rinsed out. The invention enables the amount of refill water supplied to brine formation to be determined and does not require further adjustment. Similar philosophy applies to the backwashing. The purging or final rinse is downflow or serviceflow and can be at full flow or pressure because the resin is being forced downwardly and the risk of flushing it out does not exist.

It is a further object of the invention to provide a system combining the improved operating components.

Most malfunctions of water softeners can be attributed to causes such as bridged salt, float failure, electrical problems, dirt fouling, irregular water pressures or improper programming. It is a further object of the invention to provide an improved system and apparatus to circumvent these and other problems.

It is a still further object of the invention to provide apparatus and a system of the nature indicated that is efficient in operation, simple in concept and free of maintenance problems.

Further objects and advantages of the invention will appear as the description proceeds.

In carrying out the invention according to one form there is provided in a regular flow water softening system a regeneration cycle comprising the steps of a first counterflow backwashing of the mineral with soft water, brine injecting and backwashing utilizing soft water in counterflow direction, a second counterflow backwashing of the mineral with soft water, and a strong regular flow purge.

In accordance with another form of the invention there is provided in a water softening system including a pair of tanks one of which is adapted for regeneration while the other is adapted for service, a switching valve actuated by flow of softened water and a regeneration valve actuated by softened water comprising, a control valve system having an input and two outputs, one of the outputs being connected to the regeneration valve and being normally closed, the other of the outputs being connected to the switching valve and being normally open, first valve means in the system adapted to be actuated by the switching valve for opening the one output, second valve means in the system adapted to be actuated by the regenerating valve for closing the other output, and means actuated by the regenerating valve for causing the second valve means to open the other output and causing the first valve means to close the one output.

According to a still further form of the invention there is provided a distribution valve comprising a first flat plate having a series of arcuate grooves therein, a second flat plate cemented to the first flat plate and having a series of orifices each of which registers with one of the arcuate grooves, and a third flat plate disposed against the first flat plate on the opposite side thereof relative to second plate, the third plate having an orifice therethrough at a radius equal to those of the arcuate grooves, the third plate being rotatably mounted relative to the first plate and means for applying pressure to the exposed side of the third plate.

According to a still further form of the invention there is provided in a water softening system wherein the regenerating system includes the steps of providing flows for backwashing the tank being regenerated at one and controlled rate, introducing a predetermined amount of brine into the tank and further backwashing at a second and slower rate, a second backwashing of the tank at the one rate, refilling a brine supply at the one rate and soaking the tank at no flow, and purging the tank at a third rate greater than the first rate, a flow operated rotating distributing valve comprising one set of stationary cemented together parallel plate members and a second set of rotatable cemented together parallel plate members, the one set of parallel plates comprising a first plate for directing water flows for predetermined times and amounts and having a first elongated arcuate orifice at a first radius for providing initial valve operating flow, a second elongated orifice arcuately disposed relative to the first orifice at a second radius and of a cross-section and length, respectively, for backwash flow at the one rate and for a predetermined duration, a third arcuate elongated orifice arcuately disposed relative to the second orifice at the first radius and of a cross-section and length, respectively, for brine introduction and backwash flow at the second rate and for a predetermined duration, a fourth arcuate elongated orifice arcuately disposed relative to the third orifice at the second radius and of a cross-section and length, respectively, for a further backwash flow at the one rate and for a predetermined duration, a fifth arcuate elongated orifice radially disposed at a third radius less than the first and second radii and of a cross-section and length, respectively, to accommodate the flows through the second, third and fourth arcuate orifices, a sixth arcuate elongated orifice arcuately disposed relative to the fourth orifice at the first radius and of a cross-section and length, respectively, for the refilling of brine supply, a seventh arcuate elongated orifice arcuately disposed relative to the sixth orifice at the first and second radii and of a cross-section and length, respectively, for purging flow at the third rate and for a predetermined duration, an eighth arcuate elongated orifice radially disposed at a fourth radius less than the first and second radii and of a cross-section and length, respectively, to accommodate the flow through the seventh orifice, and a central passageway for accommodating the flow through any of the orifices; a second plate for connection to exterior components and having a first orifice for flow registration with the first orifice of the first plate and of a cross-section for the initial flow, a second orifice for flow registration with the second orifice of the first plate and of a cross-section for flow at the one rate, a third orifice for flow registration with the third orifice of the first plate and of a cross-section for flow at the second rate, a fourth orifice for flow registration with the sixth orifice of the first plate and of a cross-section for flow at the second rate, and a fifth orifice for flow registration with the seventh orifice of the first plate and of a cross-section for flow at the third rate, and a central passageway for accommodating the flow through any of the orifices, a third plate disposed adjacent to said first plate for definition of passageways and having a first orifice for flow registration with the first orifice of the first plate and of a cross-section for the initial flow, a second orifice for flow registration with the second orifice of the first plate and of a cross-section for flow at the one rate, a third orifice for flow registration with the third orifice of the first plate and of a cross-section for flow at the second rate, a fourth orifice for flow registration with the fourth orifice of the first plate and of a cross-section for flow at the one rate, a fifth orifice for flow registration with the sixth orifice of the first plate and of a cross-section for flow at a refilling of the brine supply rate, a sixth orifice for flow registration with the seventh orifice of the first plate and of a cross-section for flow at the third rate, a seventh orifice for flow registration with the eighth orifice of the first plate and of a cross-section for flow at the third rate, and an eighth orifice for flow registration with the fifth orifice of the first plate and of a cross-section for flow at the second rate, and a central passageway for accommodating the flow through any of the orifices, and a fourth plate disposed between the second and third plates for further definition of passageways and having a first orifice for flow registration with the first orifice of the first plate and of a cross-section for the initial flow, a second orifice for flow registration with the third orifice of the second and third plates and of a cross-section for flow at the second rate, a third orifice for flow registration with the fourth and fifth orifices, respectively of the second and third plates and of a cross-section for flow at a refilling of the brine supply rate, a fourth orifice for flow registration with the fifth and sixth orifices, respectively, of the second and third plates and of a cross-section for flow at the third rate, a fifth orifice for flow registration with the eighth orifice of the third plate and of a cross-section for flow at said second rate, a passageway connecting the fourth and fifth orifices of the fourth plate and of a cross-section for predetermined flow at said second rate, a sixth orifice, arcuate in nature for flow registration with the second, fourth, and seventh orifices of the third plate and of a cross-section for flow at the third rate, and a central passageway for accommodating the flow through any of the orifices, the second set of parallel plates comprising: a first plate for directing water flows in predetermined amounts from one side thereof being disposed with its other side against the exposed side of the first plate of the first set and having a first orifice at a radius equal to the first radius of the first plate of the first set for flow registration with the first, third, sixth and seventh orifices of the first plate of the first set and of a cross-section for flows at the initial, third, and brine refill rates, orifice means at a second radius equal to the second radius of the first plate of the first set for flow registration with the second, fourth and seventh orifices of the first plate of the first set and of a cross-section for flows at the second rate, a central passageway communicating with the central passageways of the first, second, third and fourth plates of the first set, and a radially extending groove connecting with the central passageway and having a radial extent less than the first radius of the first plate of the second set but sufficient to reach the fifth and eighth grooves of the first plate of the first set and having a cross-section for flows at the third rate, a second plate disposed against the one side of the first plate and having a radius to cover the radial extension of the first plate but leaving exposed the orifice and orifice means of the first plate, means for supplying fluid to the one side of the first plate, and means for rotating the second set of plates.

According to a still further form of the invention there is provided in a water softening system adapted to be connected between a hard water supply line and a user service line including a pair of tanks one of which is adapted for regeneration while the other is adapted for service, and vice-versa, and a salt storage and brine formation tank, water operated automatic control apparatus comprising a first parallel plate valve means rotatably having a first position and a second position, respectively, for connecting the first of the tanks from the hard water supply line to the user service line, connecting the second of the tanks for regeneration, and vice-versa, a soft water use metering device connected in the user service line, a first cylinder and two-way operating piston therein for shifting the first parallel plate valve means from the first to the second position and vice-versa, a first mechanical link from the operating piston to the first parallel plate valve means, a second parallel plate valve means which is rotatable for supplying operating pressure in succession for each way of the operating piston, a driving connection from the metering device to the second parallel plate disk valve means for rotation thereof in response to soft water use, a third parallel plate valve means for controlling the sequence of regeneration steps in the tank being regenerated following each shift of the first parallel plate valve means, one of the plates of the third parallel plate valve means being rotatable under the influence of soft water pressure from the user service line for causing soft water flow including in succession initiation, rapid backwash, brine injection and backwash, further rapid backwash, brine forming, and purging, control valve means including a second cylinder, first, second, third, and fourth pistons therein, and means for actuating the pistons, a first line forming a drain from the third parallel plate valve means, the first piston being in the first line for controlling the drain, the first piston having an initial position closing the first line and a second position opening the first line, a second line for supplying soft water pressure from the user service line to the third parallel plate valve means, the second piston being in the second line for controlling flow of soft water therein, the second piston having an initial position closing the second line and a second position opening the second line, a second mechanical link from the operating piston to the first piston and the second piston to actuate same, respectively, in one direction to their second positions after each operation of the operating piston, thereby initiating rotation of the one plate of the third parallel plate valve means, the rotation continuing as soft water flow continues through the third parallel plate valve means producing the sequence of regeneration steps, a third line for supplying soft water pressure from the user service line to the second parallel plate valve means, the third piston being in the third line for controlling the flow of soft water therein, the third piston having an initial position opening the third line and a second position closing the third line, means including a fourth line from the third parallel plate valve means to the second cylinder for actuating the third piston to its second position after the initiation, thereby blocking the third line and preventing further rotation of the second parallel plate valve means and consequent further action of the operating piston during a particular regeneration cycle, brine line means running from the third parallel plate valve means to the first parallel plate valve means, a connection from the brine line means to the brine forming tank for supplying brine and backwash water to the one of the first and second tanks under regeneration, means in the second cylinder including the third piston in its second position for opening the connection to the brine forming tank at the time of actuating thereof to its second position, a brine water refill line running from the third parallel plate valve means to the salt storage and brine forming tank, the fourth piston being in the brine water refill line for controlling the supply of soft water therein, the fourth piston having an initial position closing the refill line and a second position opening the refill line, the fourth piston being actuated to its second position by the actuating means of the third piston at the time of actuating of the third piston to its second position, purge lines means running from the third parallel plate valve means to the first parallel plate valve means and therefrom back to the third parallel plate valve means and to a drain therein for conducting purge water flow to and from the tank being regenerated, a reset line comprising the first line running from the third parallel plate valve means to the first piston, the first piston in its initial position closing the reset line and in its second position opening the reset line, the first piston being further actuated to its first position in response to movement of the third piston to its second position whereby continuation of pressure from the third parallel plate valve means through the reset line actuates the third and fourth pistons and the second piston to respective initial positions, and rotation of the one of the plates of the third parallel plate valve means determining the respective times of backwashing, brine injecting and backwashing, brine forming and purging.

According to a still further form of the invention there is provided the water operated automatic control apparatus as described in the immediately preceding paragraph comprising mechanism for actuating the first and second pistons in one direction from their first positions to their second positions irrespective of movements of the operating pistons in two directions, and more particularly wherein the second mechanical link comprises a four radial arm cam member, a fixed pivot for the cam member, an actuating plate having a central slot receiving the pivot enabling longitudinal movement of the plate relative to the plate and the pivot, the plate being connected to the operating piston for actuation thereby, a link disposed between the radial arms and the first and second pistons of the control cylinder for operation of the pistons by the rotation of the radial arms, and a pair of one-way operating mechanisms mounted on the acutuing plate, one of the one-way operating mechanism engaging the radial arm cam member in one direction for one direction of the actuating plate, and the other of the one-way operating mechanism engaging the radial arm cam in the one direction for the other direction of the actuating plate.

According to a still further form of the invention there is provided in a water softening system adapted to be connected between a hard water supply line and a user service line including a pair of tanks one of which is adapted for regeneration while the other is adapted for service, and vice-versa, and a salt storage and brine formation tank, a parallel plate valve system for controlling the service and regeneration cycles of the pair of tanks comprising a first parallel plate valve means having a stationary plate and a movable plate having a first position and a second position, a second parallel plate valve means having a stationary plate and a movable plate having a first position and a second position, the stationary plate of the first parallel plate valve means having an input orifice for receiving hard water for softening, the stationary plate of the second parallel plate valve means having an output orifice for dispensing soft water to user service, the stationary plate of the first parallel plate valve means having two service orifices, one for connection to the service tank at the upper end thereof and the other for connection to the regeneration tank at the upper end thereof, the stationary plate of the second parallel plate valve means having two service orifices, one for connection to a conduit extending to the bottom of the service tank and the other for connection to a conduit extending to the bottom of the regeneration tank, the stationary plate of the first parallel plate valve means having a brine, backwash, and purge water orifice for connection to either of its service orifices, the stationary plate of the second parallel plate valve means having a brine, backwash, and purge water orifice for connection to either of its service orifices, the movable plate of the first parallel plate valve means and the movable plate of the second parallel plate valve means being operable together for connecting, in the first positions thereof, the input orifice to the one service orifice of the stationary plate of the first parallel plate valve means, and from the brine, backwash, and purge water orifice of the stationary plate of the first parallel plate valve means to the other service orifice of the stationary plate of the first valve means, and the output orifice to the one service orifice of the stationary plate of the second parallel plate valve means, and from the brine, backwash, and purge water orifice of the stationary plate of the second parallel plate valve means to the other service orifice of the stationary plate of the second parallel plate valve means, and for connecting in the second positions thereof the input orifice to the other service orifice of the stationary plate of the first parallel plate valve means, and from the brine, backwash, and purge water orifice of the stationary plate of the first parallel plate valve means to the one service orifice of the stationary plate of the first parallel plate valve means, and the output orifice to the other service orifice of the stationary plate of the second parallel plate valve means, and from the brine, backwash, and purge water orifice of the stationary plate of the second parallel plate valve means to the one service orifice of the stationary plate of the second parallel plate valve means.

According to a still further form of the invention there is provided in a water softening system adapted to be connected between a hard water supply line and a user service line including a pair of tanks one of which is adapted for regeneration while the other is adapted for service, and vice-versa, and a salt storage and brine formation tank, means for determining the time at which the tank in service should be switched to regeneration comprising a turbine device mounted in the user service line for rotation wherever softened water is being utilized, a first toothed wheel connected to the turbine to be driven thereby, a second toothed wheel connected to be rotated by the first toothed wheel, and valve means connected to the second toothed wheel and being adapted to supply water pressure at some point in the rotation of the second toothed wheel.

BRIEF DESCRIPTION OF THE DRAWINGS

For a further understanding of the invention reference should now be made to the accompanying drawings in which:

FIG. 1 is a diagrammatic representation of apparatus according to the invention;

FIG. 3 is a fragmentary view of the metering component of the invention;

FIG. 4 is an enlarged view, partially in section, of the metering wheels taken in the direction of arrows 4—4 of FIG. 3;

FIG. 5 is an exploded perspective view of the cycling valve component of the invention;

FIG. 6 is a sectional view of the cycling valve shown in FIG. 5;

FIG. 7 is an exploded perspective view of the switching valves of the invention;

FIG. 8 is an exploded perspective view of one of the switching valves illustrated in FIG. 7;

FIG. 9 is a series of views, 9A-9E, of components in different positions illustrating operation of the switching valves of FIGS. 7 and 8;

FIG. 10 is a sectional view of the control cylinder, the switching valve operating cylinder, and the spur cam components of the invention;

FIG. 18 is an exploded perspective view of certain of the operating components of the regeneration valve of FIG. 15;

FIG. 18A is a sectional view taken substantially in the direction of arrows 18A—18A of FIG. 18;

FIG. 18B is a view taken substantially in the direction of arrows 18B—18B of FIG. 18A;

FIG. 19 is a series of elevational views, 19A-19E, of certain of the operating components shown in perspective in FIG. 18;

FIGS. 21, 22, and 23 are elevational views of a two-way/one-way operating valve spur cam system;

FIG. 24 is a sectional view on an enlarged scale taken substantially in the direction of the arrows 24—24 of FIG. 21; and FIG. 25 is a sectional view on an enlarged scale taken substantially in the direction of arrows 25—25 of FIG. 23.

DESCRIPTION OF THE PREFERRED EMBODIMENT

General

Figure 2:
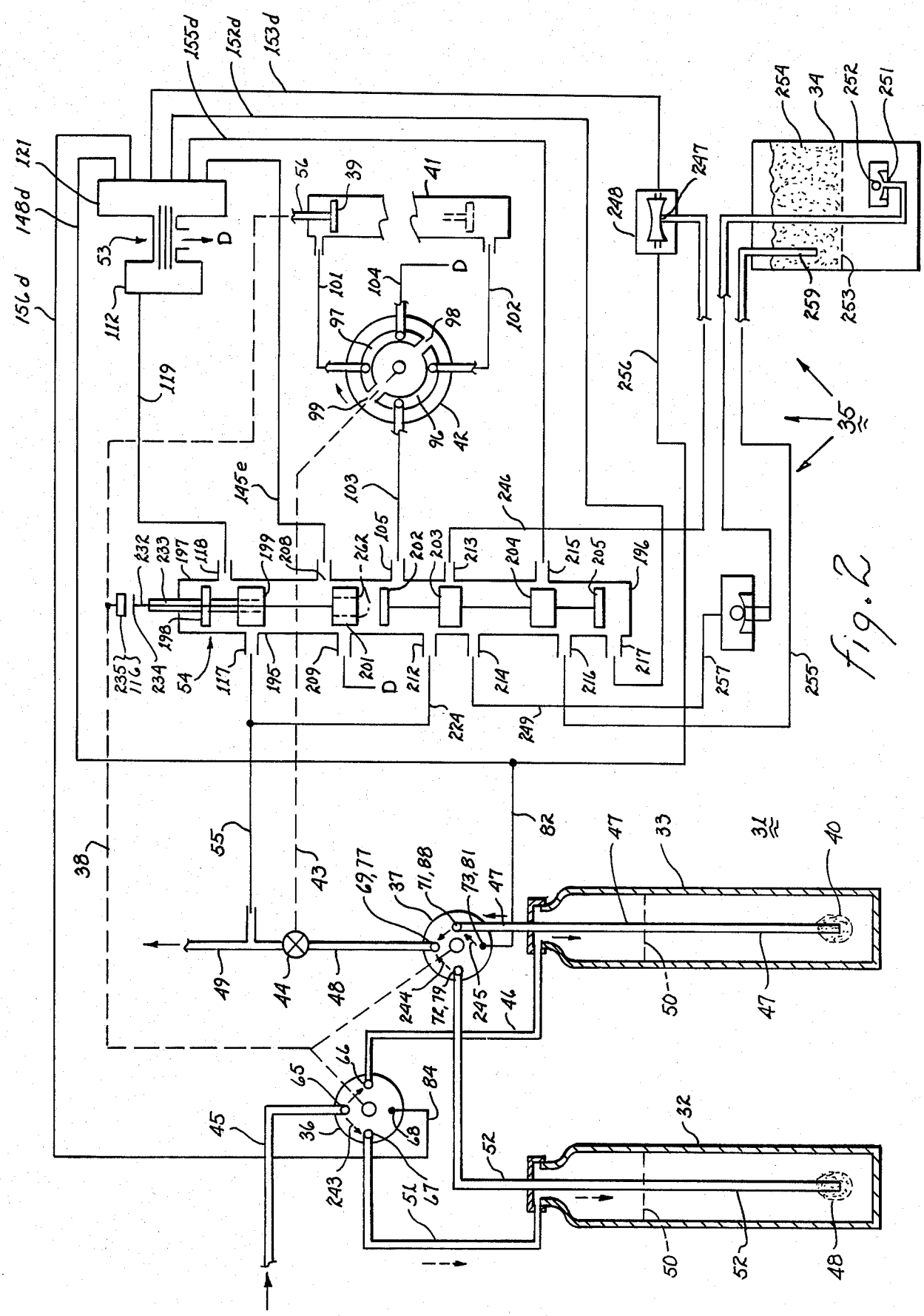
FIG. 2 is a diagram of the system and its components.

Referring more particularly to the drawings, the invention is shown in FIG. 1 as embodied in structure 31 comprising a tank 32, a tank 33, a salt storage and brine formation container 34 and a control system 35 which is water operated.

In FIG. 2 the control system 35 is laid out and elaborated upon and the tanks 32 and 33 are illustrated together with rotary valves 36 and 37 which interconnect the two tanks 32 and 33 and form part of the control system.

Operation of the rotary valves 36 and 37 is achieved through a link connection shown by the dotted line 38 in FIG. 2 which extends to an operating piston 39 functioning in an operating cylinder 41. Soft water pressure is supplied to one side of the piston 39, or the other, through a meter wheel valve 42 which is operated through a mechanical link shown by the dotted line 43 extending to a water use meter 44.

In the system as shown in FIG. 2 the tank 33 is supplying softened water to the user, the softening being effected by the presence of mineral inside of the tank as is well understood. For this purpose hard or raw water would flow through supply conduit 45 through rotating valve 36 and through conduit 46 and tank 33, and from tank 33 through conduit 47, through rotating valve 37 to conduit 48 and through water use meter 44 to conduit 49 and thus to the soft water user. After the tank 33 is exhausted, as determined by the operations of the water use meter 44 and the water meter valve 42, the valves 36 and 37 switch positions, as will be described, through the operations of the piston 39 and link 38, to the point where the tank 32 is in service and the tank 33 is connected to the system for recharging or regeneration of the mineral therein. For the tank 32 to supply softened water, the flow takes place from conduit 45, through valve 36 and conduit 51 to tank 32 and therefrom through conduit 52 to the rotating valve 37 and then through conduit 48, water use meter 44 and conduit 49 to the soft water user. Screens 40 are provided at the lower ends of the conduits 47 and 52 to prevent the softening mineral from leaving the tanks. The mineral level in the tanks is shown by the dotted lines 50.

Regeneration of the mineral in whichever tank is under regeneration is under the control of the regenerating valve structure 53 which through its function, as will be more particularly described in this specification, initiates operation of the regeneration cycle, which includes backwashing the mineral at a relatively fast rate, injecting brine into the tank being regenerated and after the brine injection has terminated continues backwashing at the same rate at which the brine was introduced, further backwashing at the same rate as the initial backwashing, introducing water into the brine forming container 34 at a specified rate followed by rinsing, or purging, at a faster rate than the fast backwashing.

Service flow through the tank supplying soft water is in a downflow direction tending to force the mineral toward the bottom of the tank which may be termed regular flow. The high rate backwash is carried on in a counterflow, or upflow, direction, the brine introduction and slow backwash is carried on in an upflow direction and the purge or rinse step is carried on again in a downflow direction so that mineral is not tended to be washed out of the tank being regenerated.

The control system 35 also includes a control cylinder 54 having pistons therein for controlling the supply of soft water to the control system to carry out its operations. Thus soft water is supplied under the influence of control cylinder 54 to the regenerating valve structure 53, to the water meter valve 42 and thus to the operating cylinder 41 all as will be more particularly described. Further soft water needed for brine formation, injecting of brine into the tank being regenerated and any other purposes is all supplied through the influence of the control cylinder 54 to which all of the soft water subsequently used during regeneration is supplied through conduit 55 from the user, or service, side of use meter 44.

As assumed, the tank 33 is supplying soft water and for this condition the piston 39 and the water meter valve 42 are shown in the appropriate positions for carrying out the regeneration steps as already indicated. When the water meter 44 has functioned sufficiently to determine that the tank 33 is exhausted and should be replaced by tank 32 this will be established by the water meter valve 42 reaching a position where water pressure is supplied to the opposite side of piston 39, thereby causing it to shift its position and causing the valves 36 and 37 to change to their other positions through the link 38. Following this, the same sequence of regenerating steps will occur for tank 32.

In the process of shifting from one tank to the next and directing the phases of regeneration the valves 36, 37, 42 and 53 and the control cylinder 54 are utilized. Each of the valves is of the parallel plate construction, according to the invention, as will become clear wherein a movable plate of relatively hard plastic is tightly held against the face of a stationary plate and the valves operate by aligning, or closing, ports or orifices of one plate with respect to the other.

SWITCHING, ROTARY VALVES

Referring first to the construction of the switching valves, or rotary valves, 36 and 37 reference should be had to FIGS. 7, 8 and 9 in connection with FIG. 2.

As may be visualized in FIG. 7, the rotary valves 36 and 37 are connected together and form part of a unitary structure which is part of the control system 35 shown in FIG. 1. The connecting link shown by dotted line 38 in FIG. 2 and shown by the arrow 38 in FIG. 7 comprises the operating rod 56 of the piston 39, a shaft 57 connecting the rotary valves 36 and 37 and a connecting link 58 engaging a square portion 59 of the shaft 57 and pivotally connected to the operating rod 56 as shown.

The rotary valves 36 and 37 are mounted back-to-back relative to each other and are supported in effect by the square shaft 59 which is connected to each of the movable portions of the valves for operating them as needed.

The rotary valve 36 comprises a stationary plate 61 and a rotary plate 62 shown dotted in FIG. 7 because rotary plate 62 is behind the stationary plate 61. Rotary valve 37 comprises a stationary plate 63 and a rotary plate 64.

The stationary plate 61 of rotary valve 36 includes the orifices 65, 66 and 67 and 68, the orifices 65, 66 and 67 having to do with the flow or raw or untreated water and the orifice 68 having to do with the flow of regeneration water. The stationary plate 63 of rotary valve 37 includes orifices 69, 71, 72 and 73, the orifices 69, 71 and 72 having to do with the flow of soft water in the system and the orifice 73 having to do with the flow of regeneration water all as will become clear subsequently in this specification. The rotary plates 62 and 64 are attached to the square shaft 59 and are therefore movable whenever the cylinder 41 and piston 39 call for a shifting of the rotary valve members from one position to the other. The rotary valve members 36 and 37 are shown incomplete in FIG. 7 for illustrative purposes only and the rotary valve 37 is shown completely (exploded perspective) in FIG. 8 and certain components thereof are shown in FIG. 9. A complete description of the rotary valve 37 will be given in subsequent paragraphs with respect to FIG. 8 and FIG. 9, it being understood that a corresponding structure exists for the rotary valve 36 without the need for duplicate showings.

Referring to FIG. 8 the rotary valve 37 includes the stationary plate 63, the movable or rotatable plate 64, the stationary plate 74, the rotatable plate 75 and the cover 76. The plate members 74, 63, 64 and 75 may be made of well-known synthetic materials which have a relatively smooth flat surface such for example as teflon, nylon or polyurethane. The stationary plate 63 is disposed against the stationary plate 74 and is cemented thereto over the adjoining surfaces substantially over the whole surface. Plate 74 includes orifices 77, 78, 79 and 81 which join with and form continuations of, respectively, the orifices 69, 71, 72 and 73 of stationary plate 63. Conduits 48, 47, 52 and 82 connect to orifices 77, 78, 79 and 81 respectively for conducting water therethrough. Stationary plates 63 and 74 in effect form one plate and the orifice 73 is an arcuate orifice which joins with the orifice 81 in order to conduct liquid over a desired range of movement of the rotatable plate 64.

The rotatable plate 64 is, in essence, semi-circular in shape and is adapted to be attached to the square shaft 59 in order that this plate may be rotated. The rotatable plate 64 includes an arcuate orifice 86, in effect, located opposite to and diametrically parallel to the semi-diameter of the movable plate 64. The semi-diametrical periphery of the rotatable plate 64 includes the re-entrant part giving rise to the tabs 87 and 88 which are arranged to be disposed relative to the ports 71 and 72, respectively, of stationary plate 63, while the arcuate orifice 86 is adapted to communicate with arcuate orifice 73. The positions of the rotatable plate 64 and the stationary plate 63 in FIG. 8 are non-operational, in essence, and are shown for illustration of the structural features. The rotatable semi-circular plate 75 is of the same outline shape as semi-circular plate 64 and includes re-entrant parts giving rise to tabs 89 and 91 which correspond to the tabs 87. The plate 75 does not include any arcuate orifice and is, in effect, a solid piece which is cemented against the rotary plate 64 over the whole of the adjoining surfaces. This makes the arcuate orifice 86 an arcuate passageway in an otherwise solid member comprising the plates 64 and 75. The length of orifice 86 is such that communication is established from orifice 73 to orifices 71 or 72, depending on the position of the plate 64. The cover 76 is of the same synthetic plastic material as the other parts and is a cylindrical cup shaped device whose inner diameter fits over the outer diameter of the stationary plate 74 and forms a completely self-contained unit for the rotary valve member 37. In operation the combined rotatable plates 64 and 65 are disposed against the exposed surface of the combined stationary plates 74 and 63 with the cover 76 completing the passageway for liquids flowing through the various conduits as will be described. In FIG. 8 the conduits 47, 48, 52 and 82 correspond to the conduits bearing the same reference characters on FIG. 2.

Considering that the various plates of the valve member 37 are assembled as described and the cover 76 disposed thereover, and considering the showing of FIG. 2, it may be visualized that water would flow into the valve 37 through either conduit 47 or 52 and would flow outwardly through conduit 48.

Thus it may be understood that when the parts of the valve member 37 are assembled as described and water pressure comes in through either of the conduits 47 and 52 and flows out through conduit 48, the water pressure inside of the cover 76 is exerted against the whole surface of the movable valve members 64 and 65 and thus it holds the inner surface of valve member 64 firmly against the adjoining surface of the valve member 63 thereby providing a seal and permitting no flow except when the appropriate orifices are open.

Similarly when the corresponding structure of the rotary valve 36 is assembled and which, though not illustrated, specifically, totally, would be the mirror image of the corresponding parts shown in FIG. 8 water flow would enter through conduit 45 (orifice 65) and exit through either conduit 51 (orifice 67) or conduit 46 (orifice 66) as the conditions of operation called for.

In FIG. 9 the rotatable plate 64 and the stationary plate 63 are shown together in various positions for different conditions of operation and the various views of this figure should be considered in connection with the showing in FIG. 7 of these parts, and also in connection with the showing of the valve 37 in FIG. 2. In FIG. 9A the relative positions of stationary plate 63 and rotatable plate 64 are the same as the positions of these same parts in FIG. 7 and correspond to the solid line arrow position of valve member 37 in FIG. 2.

In this condition as described earlier in this specification the tank 33 is supplying soft water to the user's service and thus the tank 32 is in the regeneration process and conceivably could be on hold if the regeneration process has run its course. Thus in FIG. 9A the tab 91 covers the orifice 72 and flow can take place from conduit 47 through orifice 71 because it is exposed and through orifice 69 to conduit 48. The arcuate orifice 86 is in communication with arcuate orifice 73 and orifice 72. Hence a passageway exists between conduits 52 and 82 for a regeneration purpose to be subsequently described. From the position shown in FIG. 9A movement of the rotatable plate 64 continues in the counter-clockwise direction to the position shown in FIG. 9B where the tab 91 begins to expose the orifice 72 which then permits flow through the conduit 52 from the regenerated tank 32 and flow can take place through orifices 72 and 71 through orifice 69 to conduit 48. In FIG. 9C in the continued counter-clockwise movement of the plate 64 the orifice 72 is almost totally exposed as is the orifice 71 whereby soft water is fed from both tanks 32 and 33 as described to the service conduit 48. In the positions of FIGS. 9B and 9C the arcuate orifice 86 is no longer in communication with orifice 72 and no flow takes place therethrough.

In FIG. 9D the continued counter-clockwise rotation of plate 64 has totally uncovered the orifice 72 by tab 91 and the tab 89 has virtually covered the orifice 71. Also, in this position the arcuate orifice 73 is still not in communication with orifice 71 and is out of contact with orifice 72. Thus in the position of FIG. 9B flow is taking place from the recharged tank 32 and the exhausted tank 33 is virtually out of service. The flow as may be visualized in consideration with FIG. 2 takes place through conduit 45, through orifices 65 and 67 of valve 36, through conduit 51 into the recharged tank 32, out of the recharged tank through conduit 52 and into the orifice 72 and out thereof through orifice 69 of valve 37 to user conduit 48. In the final position of the movable plate 64 following continued counterclockwise rotation, the tab 89 now completely covers the orifice 71 and the orifice 72 is totally uncovered. Also in this position the arcuate conduit 86 communicates with arcuate conduit 73 and the orifice 71 for regeneration purposes to be described.

It will be understood that the construction and the operation of the rotatable plate 62 of the rotating valve 37 takes place with corresponding parts as described for valve 37 in connection with FIG. 9. It is not believed necessary to duplicate this description of structure and operation. When the next cycle of operation is called for by the appropriate structure, the rotatable plate 64 in FIG. 9 moves clockwise from the position shown in FIG. 9E to the position shown in FIG. 9A with the reverse direction of flow taking place as may be understood although the flow through the conduit 48 takes place in exactly the same direction as does the flow through conduit 45. The total span of movement from the position of FIG. 9A to the position of FIG. 9E is ninety degrees for the movable plate 64. Thus referring to FIG. 7 the link 58 actuated by the stem 56 rotates the square shaft 59 ninety degrees in one direction followed by ninety degrees in the other direction under the action of piston 39.

METER VALVE

Fluid pressure is supplied to the cylinder 41 to actuate piston 39 through the operation of the rotary timing valve 42 also referred to herein as the meter wheel or valve. The diagrammatic showing of the timing or meter valve 42 is amplified in the illustrations of FIGS. 5 and 6. The operation of the meter valve should also be considered in connection with the structure of the water use meter 44 which through the linkage shown by the dotted line 43 of FIG. 2 drives the meter valve 42. The water use meter 44 and the driving mechanism between it and the meter valve 42 is illustrated in FIGS. 3 and 4.

Meter valve 42 comprises a stationary plate 92, a rotatable plate 93, a second rotatable plate 94 cemented to the first rotatable plate 93, and a cover member 95. The cover 95 is cylindrical in form and surrounds the rotatable plate 93, 94 and has its edges cemented to the periphery of the stationary plate 92. The rotatable plate 93 has a pair of essentially semi-circular grooves 96 and 97 separated at their ends by spacers 98 and 99. The plate 94 is cemented to the plate 93 over the total common surface, thereby providing the rotatable plate 93, 94 with closed semi-circular grooves 96 and 97. The stationary plate 92 has four conduits 101, 102, 103 and 104 connected thereto, the conduits and the orifices terminating them in the stationary plate being at a radius to communicate with the closed semi-circular grooves 96 and 97. The conduits 101 and 102 are connected respectively to the two entrance orifices of the operating cylinder 41, the conduit 103 is connected as a source of supply of soft water to the port 105 of the control cylinder 54 and the conduit 104 is connected to a Drain, D.

Since soft water under pressure comes through conduit 103 and into either of the grooves 96 and 97 it will have a tendency to lift the rotatable plate 93, 94 away from the stationary plate 92. This is prevented by a spring 106 disposed between the outer surface of plate 94 and the inner surface of the cover 95. The spring 106 counterbalances the pressure indicated and holds the interior surface of the plate 93 against the adjacent side of the stationary plate 92. The rotating plate 93, 94 is mounted on a shaft 107 which is connected to the spoked wheel 108 whose spokes 109 are adapted to be engaged by pegs 111 forming part of the meter wheel 112.

The water wheel 112 has a body, or hub, 112a attached to shaft 115, the body having rectangular radial grooves therein in which the pegs 111 are disposed for flip-in or flip-out movement. The pegs are resiliently held in place by a spiral garter spring 110. As may be seen the pegs are eccentrically held by the spring 110 so that there is a recess for the pins to move into.

If the water is hard and the tanks need to be recharged often a lot of pegs 111 are turned out as shown. This causes the spoked wheel 108 to rotate faster. On the contrary, if the water is less hard, fewer pegs 111 are turned out and the spoked wheel 108 to move slower. Thus the apparatus is adjustable for the hardness of water, or sensing the time for regeneration.

The water meter 44 may be of any well-known type having a turbine type wheel or the like 113 which is operated by water flowing therethrough from conduit 48 to conduit 49. The turbine wheel 113 through a system of gears 114 drives a shaft 115 which is connected to the meter wheel 112 and thereby drives it. Other forms of water meters may, of course, be used.

The operation of the metering valves 42 and the water meter 44 may now be understood so as to control the shifting of the rotary valves 36 and 37. As soft water is used by the user the water meter 44 turns, and through the link 43, the shaft 115 drives the meter wheel 112 and the spoked wheel 108 to rotate the rotating member 93 relative to the orifices of the conduits 101, 102, 103 and 104. When the meter 44 has turned a sufficient number of revolutions, that is to say sufficient soft water has been consumed, the meter wheel 112 will have turned a sufficient number of times, or distance, to cause the spoked wheel 108 to rotate the rotatable plate 93 to a point to bring the other one of grooves into operating position with the conduit 103. Thereby the pressure is supplied to the opposite side of piston 39 causing it to move to the opposite end of the cylinder and causing the valves 36 and 37 to shift to the opposite position through the operating link 38, thus setting the regeneration of the exhausted tank into motion.

Referring to FIG. 2 it may be observed that the arcuate groove 96 connects the conduit 103 to the conduit 102 and thus to the lower part of the operating cylinder 41, thereby having forced the piston 39 to the opposite end as shown. For this to have occurred any water on the opposite side of the piston has to have been drained out. It will be observed that this has taken place through conduit 101 from the other port of the operating cylinder to the groove 97 of the meter valve, the groove 97 being connected to the conduit 104 and thus to the drain, D.

Continued rotation of the spoked wheel 108 in the clockwise direction causes the semi-circular groove 96 to reach the point where the spacer 98 is opposite the port terminating conduit 102 and the spacer 99 is opposite the port terminating the conduit 101. Further continued rotation of the spoked wheel brings the semi-circular groove 96 into communication with the port terminating the end of conduit 101 whereupon water pressure is applied through conduit 101 to the immediate side of the piston 39 forcing it to the dotted line position in cylinder 41 (FIG. 2). This effects change in position of the rotating valves 36 and 37 as described, and drainage of the water in the cylinder 41 is achieved through conduit 102, the port terminating it, the semi-circular groove 97, the conduit 104, and drain D.

Since the plate 93 is made of the plastic material as indicated herein and is very flat and the adjacent surface of the stationary plate 92 is also made of a smooth plastic material and is equally flat there is a complete seal between the adjacent surfaces of these two plates and no leakage takes place. Flow takes place only through the closed semi-circular grooves as indicated. No seals, for example, are needed except a very mild one at the point where the shaft 107 passes through the cover or casing 95. Relative simplicity and simplified operation are therefore achieved.

When the meter valve 42 reaches the point where it causes cylinder 41 to operate thereby shifting the position of the rotary valves 36 and 37, the same link 38 functions to actuate control cylinder 54 through a two-way/one-way cam structure 116 shown diagrammatically in FIGS. 2, 7 and 10 and in detail in FIGS. 21-25 to be more particularly described subsequently in this specification.

One result of the operation of control cylinder 54, as will be more particularly described, is the furnishing of soft water for the operation of the regeneration valve 53 structure, such supply of soft water taking place through conduit 49, conduit 55, and port 117 on control cylinder 54 and from port 118 of control cylinder 54 to the regenerating valve 53 through conduit 119.

REGENERATING VALVE STRUCTURE

The regenerating valve structure 53 carries out the sequence of steps necessary to regenerating an exhausted tank of mineral and comprises the regenerating valve proper 121, a water turbine mechanism 122 for driving the regenerating valve, and pressure regulating mechanism to be described. For description of these components reference should be had to FIGS. 15-20.

The regenerating valve 121 comprises a stationary plate 123 member and a rotating plate member 124. The stationary plate 123 member comprises individual plates 125, 126, 127 and 128 shown as part of an exploded perspective view in FIG. 18 and as part of elevational views shown in FIG. 19. The rotating plate 124 member comprises a series of parallel plates 129, 131 and 132.

The parallel plates 125, 126, 127 and 128 may be relatively thin or thick lamina of any suitable synthetic or plastic material as indicated herein and have various orifices therethrough as will be more particularly described both as to form and function and after the orifices are formed therein the plates are cemented together over their whole surfaces so as to form a single unitary structure 123 through which water may be conducted for flow only through inter-connecting orifices also as will be more particularly described.

The plates 129, 131 and 132 may be relatively thick or thin parallel plates made of suitable synthetic material and have openings therethrough or therein as shown and to be more particularly described and after forming are cemented together over the total of their surfaces so as to form one unitary member 124 which is rotatable. The plate 132 includes a drive mechanism 133 also to be more particularly described. When the rotatable plate member 124 rotates relative to the stationary plate member 123 the adjoining surface between these plates, or interface, may be indicated by the reference character 134.

Figures 15, 16, 17:
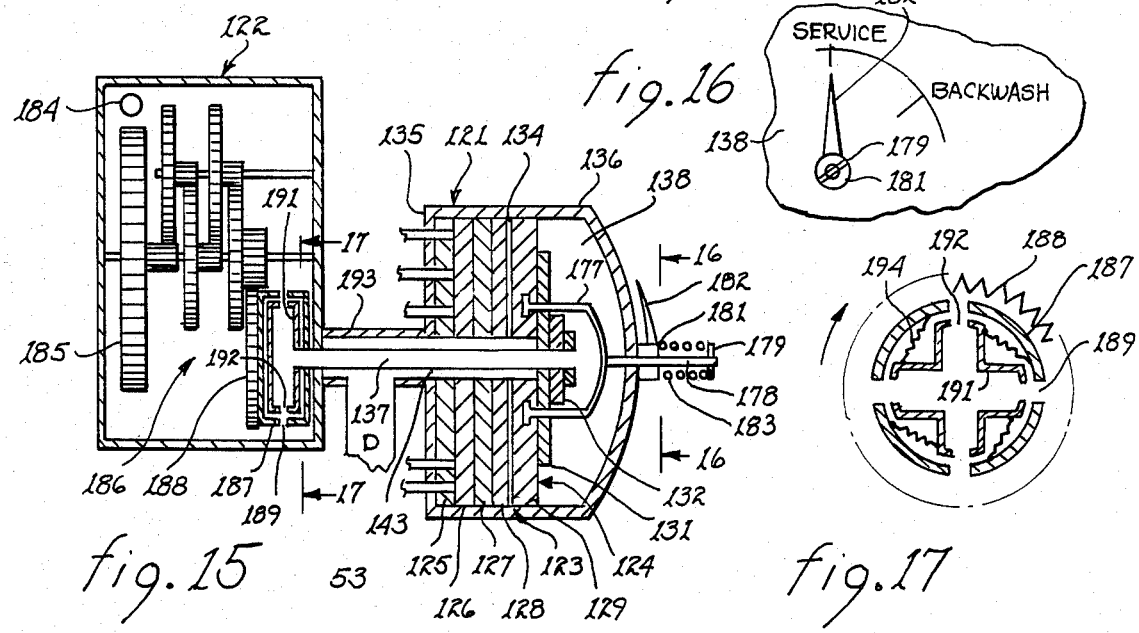
FIG. 15 is a sectional view of the regeneration valve, metering member, and pressure control system of the invention.
FIG. 16 is a view taken substantially in the direction of arrows 16—16 of FIG. 15.
FIG. 17 is a sectional view taken substantially in the direction of arrows 17—17 of FIG. 15.

When the stationary plate member 123 and the rotatable plate member 124 are assembled together they are disposed in a container which includes a base member 135 and a cover 136 as may be seen best in FIG. 15. Soft water is supplied to the regenerating valve 121 through a hollow shaft or conduit 137 extending from the casing of the turbine 122 to the frontal space 138 inside of the cover 136.

Rotatable plate 139 includes three orifices, 139, 141 and 142 through which soft water is supplied from the space 138 to the various orifices as shown in the stationary plate 128 and the plates 125-127 cemented thereto as will be described. That is to say, the plate 129 rotates relative to the plate 128 and in the course of the rotation which is clockwise in FIG. 18, the orifices 139-142 contact different ones of the orifices shown in plate 128 and thus water flow is directed through the stationary member 123 through different pathways. It will be noted that the orifice 139 is smaller in diameter than the orifices 141 and 142 in order that different rates of flow of water may be accommodated. The rotatable plate 129 also includes a center or central aperture of opening 143 and a radial slot 144 extending therefrom, the radial slot and the central aperture forming part of a drainage passageway as will become clear.

The thickness of the plate 129 as well as the dimensions of orifices 139, 141 and 142 are chosen in the course of construction to provide the necessary volume flow of water for the purposes needed. The dimensions of the orifices as well as the plate thickness may be varied to fit particular circumstances.

The plate 128 of the stationary plate member 123 has various orifices on it forming passageways therethrough which orifices are of a size, cross-section and length so as to determine the amount of flow of water through the stationary member for each purpose as intended as will be made clear. These orifices cooperate with the orifices 139, 141 and 142, the radial groove 144 and the central aperture 143 of movable plate 129 for this purpose. For the rotatable plate 129 to rotate it is necessary for soft water flow to take place through the water turbine mechanism 122 since it is this member through the operation of the hollow shaft 137 that turns the rotatable member 124 (129). Soft water flow is made possible by the actuation of piston 39 and the action of control cylinder 54, as will become clear, to enable flow to pass through conduit 119 to the meter turbine which will rotate if flow takes place through the rotatable and stationary plates 124 and 123, respectively.

The orifices on and through stationary plates 128, 127, 126, 125 and the organization thereof are such that flow will take place therethrough when passageways or orifices of the same reference characters including subletters form a continuous passageway. Thus, for example, the orifice 139 of rotatable plate 129 may, by following the phantom line 145, trace a passageway from orifice 139 through orifice 145a of plate 128, orifice 145b of plate 177, orifice 145c of plate 126 and orifice 145d of plate 125.

Referring to FIG. 15, it will be seen that the rear or base cover 135 of the regenerating valve 121 has a series of conduits extending therethrough and these conduits pass through or are connected to orifices in the stationary plate 125. These conduits carry water flow to and from the output of the regenerating valve 121 and the various functional components of the system illustrated in FIG. 2. These conduits will subsequently be assigned reference characters when considered in connection with the operation of the valve.

Figure 20:
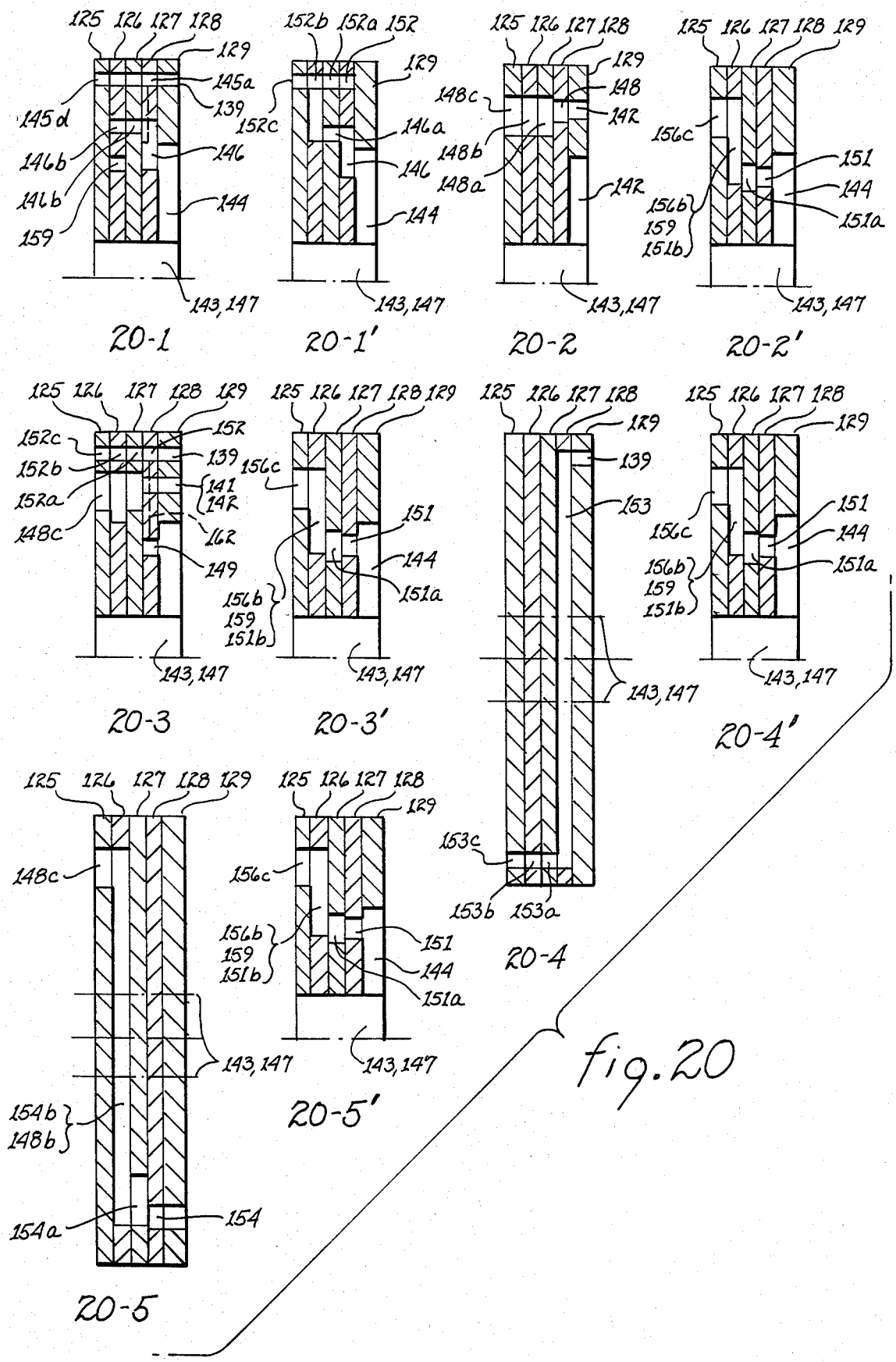
FIG. 20 is a series of sectional views, 20A-20-I taken at different circumferential positions of the operating components of the valve illustrated in FIGS. 18 and 19.

The structure and orifices of the valve members as shown in FIGS. 18 and 19 will be considered and described in connection with an elaboration of the operation of the valve, and the passageways therethrough will further be pointed out in connection with the various cross-sectional views of FIG. 20. The cross-sectional views of FIG. 20 are developed for each operable location of the rotatable valve member 124 relative to the stationary valve member 123. The orifice 145d of stationary plate 125 is connected to conduit 145e which is connected to the control cylinder 54 as will subsequently be made clear.

In the interest of utilizing reference characters adjacent each other for parts of related structure, the orifices on stationary plate 128 and the other stationary plates 127, 126 and 125 will be identified. Consider first the stationary plate 128.

The orifice 145a is oblong, as shown, at a particular radius which is the same as the radius of orifice 139 of rotatable plate 129, provides a water passageway open in the first instance when the system calls for regeneration so that the rotatable plate 129 (124) can start its clockwise rotation to initiate all of the functions. It will be understood that all of the orifices thus far described, and to be described, extend all of the way through the various plates so that they form through passageways except as will be specifically noted in one instance. References to the direction of rotation will be made without, in each instance, referring to the rotatable plate 129 (124) when describing the location of the orifices including stationary plate 128. Thus the orifice 152 is arcuately disposed through stationary plate 128 in the direction of rotation. The arcuate orifice 152 is at the radius of the orifice 139 of rotatable plate 129 and is of relatively small cross-section since the flow therethrough is utilized for control purposes in connection with control cylinder 54 as will become clear. The arcuate extent of orifice 146 is selected for this same purpose.

In describing the orifices on stationary plate 128 the description thereof will be considered in connection with the rotatable plate 129 as though this plate were rotating to different positions during operation for providing further understanding. Thus the registration of orifice 139 with orifice 152 may be considered as one of the early positions of the rotary plate 129. Similarly in describing the orifices reference should be had to both FIGS. 18 and 19. Around the periphery of the stationary plate 128 FIG. 19A there are a series of numbers 1, 2, 3, 4, 5, 6 and 7 which represent different positions of the rotating plate 129 as it moves around the stationary plate 128 in the clockwise direction.

In position 1, the starting position, the orifice 139 registers with the elongated orifice 145a and the orifices 141, 142 of rotating plate 129 do not register with any openings in stationary plate 128. The orifice 145a is of relatively small cross-section because it carries only a small amount of water to start the rotatable member rotating.

A rectangular and radial orifice 146 is disposed along the radius of position 1 and is of an extent to communicate with the rectangular radial slot 144 of plate 129 and thus will communicate with the central apperture 143 of plate 129 and a central apperture 147 of plate 128. The radial orifice 146 performs a drain function in connection with the operation of control cylinder 54 as will become clear. In position 2, FIG. 19A, the orifice 139 is in registry with orifice 145a at the right most portion thereof and the larger orifice 142 of plate 129 is in registry with the arcuate orifice 148 of plate 128.

The arcuate orifice 148 is radially and arcuately disposed relative to orifice 145a, has a radial extent equal to about the diameter of orifice 142 and thus is of a cross-sectional dimension sufficient to carry soft water for backwash purposes at a relatively high rate. The arcuate extent of orifice 148 is selected to provide the backwash time necessary, bearing in mind the time of rotation developed by rotatable plate 129. Subsequent movements of rotatable plate 129 will bring the second orifice 141 of plate 129 into registration with the arcuate orifice 148 thereby providing the increased rate of flow for backwashing purposes. Thus backwashing starts relatively slowly with one orifice 142 and reaches a much more rapid rate when orifice 141 reaches orifice 148. Also, in position 2 the radial slot 144 registers with arcuate orifices 149 and 151. Arcuate orifice 149 is connected at the back surface of stationary plate 128 with orifice 145a to perform a drainage function in connection with the operation of control cylinder 54 as will be described. See FIG. 20-8. The arcuate orifice 151 is of a substantial arcuate extent so as to provide a drainage orifice in cooperation with rectangular slot 144, apperture 143, etc. throughout the first backwash, brine introduction and a slow backwash and an additional step of fast backwash cycle. Thus the arcuate extent of orifice 151 is about a semi-circle.

Continuing rotation of the rotating plate 129 brings this plate to position 3 where the orifice 139 registers with an arcuate orifice 152. This orifice having a cross-section determined by the dimensions of orifice 139, has an arcuate extent sufficient to provide the operating time in connection with the operation of control cylinder 54 as will be described. Further continued rotation of plate 129 brings the orifice 139 into initial registration of the beginning of arcuate orifice 153, position 4. This orifice has a cross-sectional area determined by the dimensions of orifice 139 and provides the water flow necessary for brine introduction into the tank being regenerated and a relatively slow backwash as will become clear, the orifice 153 having an arcuate extent sufficient to provide the time necessary for these functions. Also, at position 4 the orifice 141 of plate 129 moves away from the right hand extent of orifice 148 and thus fast backwash has discontinued.

Continued rotation of plate 129 brings this member to position 5 at which point the orifice 139 leaves the extremity of arcuate orifice 153 but the orifice 142 registers with arcuate orifice 154. Orifice 139 leaving the orifice 153 terminates the cycle of brine introduction and following slow backwash and the registration of orifice 142 with orifice 154 starts another phase of rapid backwashing and continues with the orifice 141 also registering with orifice 154 for a period of time determined by the arcuate extent of the orifice 154. The arcuate orifice 151 functions in this stage of the regeneration to provide the drainage necessary.

Continued rotation of the plate 129 brings orifice 139 into registration with arcuate orifice 155, position 6, the cross-sectional dimensions of this orifice being determined by the diameter of the orifice 139 and provides the necessary flow capacity for providing brine refill water to replace the brine that has been utilized in the current regeneration cycle. At this point orifice 141 has left orifice 154. The arcuate extent of orifice 155 is determined by the length of time necessary to provide the brine refill water flow.

Continued rotation of the rotating plate 129 removes orifice 139 from arcuate orifice 155 thus terminating the brine water refill portion of the cycle. This in effect is position 7 at which point the orifice 142 begins to register with arcuate orifice 156 of plate 128. The arcuate orifice 156 has a substantial radial extent such that the orifices 139, 141 and 142 register with it throughout the major portion of its length. Orifice 156 is shown tapered at each end in order that the flow therethrough from orifices 139, 141 and 142 may begin relatively slowly, build up to a maximum and then decrease relatively slowly instead of having a very large blast flow along with rapid termination. This aspect of the shape of orifice 156 may be selected to fit particular circumstances. Orifice 156 conducts the flow necessary for the high rate of final rinse or purging phase of the regeneration cycle.

From position 7 to position 1 the radial slot 144 of plate 129 registers with the arcuate orifice 157 which has a radial extent equal to that of arcuate orifice 156 and provides the cross-sectional flow capacity necessary to conduct the purge water from orifice 156 through to rectangular slot 144 and drainage aperture 143. Thus while the arcuate extent in terms of length of orifice 157 is shorter than that of 156, in terms of degrees they are the same so that while purge flow is taking place through orifice 156 drainage flow is available through orifice 157. It will be observed that the arcuate extent of orifices 156 and 157 is long, almost half of the cycle and is selected to provide the necessary purging time or rinse time for removing all evidences of salt from the recharged tank.

Continued movement of the rotating plate 129 brings it again to position 1 at which the conditions previously described exist and the cycle is ready to repeat as will become clear.

Refer now to stationary plate 127, FIG. 19B:

This plate 127 is of the same exterior dimensions as plate 128 and has orifices thereon to communicate with various of the orifices described in connection with plate 128. The thickness of this plate may be the same as that of 128 and the dimensions of the orifices are such as to conduct the flow as determined by the orifices on plate 128. The orifices of plate 127 will bear the same reference characters as the orifices with which they register on plate 128 utilizing supplemental reference letters, for example, (145) 145b and it will be understood that the orifices of plate 127 will register only with the corresponding numbered orifices of plate 128 unless otherwise indicated. Thus the orifices of plate 127 permit no cross flow from one pathway to another. Plate 127 has orifice 145b which is shown circular and need not be oblong as 145a, 152a registering with about the center of 152, 146a registering with 146, 148a registering with 148, 151a registering with 151, 153a registering with one end of 153, 154a registering with 154, 155a registering with 155, 156a registering with one end of 156 and 157a registering with 157. It will be recalled that the adjacent surfaces of plates 127 and 128 are cemented together to provide a completely waterproof seal between them so that flow will take place only as indicated by the orifices. Centrally of the plate 127 there is a central aperture 147a which communicates with central aperture 147 to form a drain passageway. The dimensions of the orifices on plate are about as indicated and are appropriate to the flow rates that apply.

In plate 128 there is a small orifice 158 with which registers a corresponding orifice 158a of plate 127, a corresponding orifice 158b of plate 126, and a corresponding orifice 158c of plate 125, these orifices being useful for aligning the plates 125, 126, 127 and 128 during the manufacturing process and serve no other function.

Referring now to FIG. 19C, stationary plate 126:

It will be recalled that this plate may be of the same thickness as the other plates and the orifices designed to connect with orifices bearing the corresponding reference characters. The shape and dimensions of the orifices are such as to conduct the flow indicated by the corresponding orifices of the other connected plates.

Plate 126 has an orifice 145c which is of the same dimensions as and registers with orifice 145b. Plate 126 has an angularly disposed orifice 146b, 152b. This elongated groove or orifice registers with the orifices 146a and 152a of plate 127 for providing certain drainage passageways as will become clear. Elongated and arcuately formed in stationary plate 126 is an orifice 148b, 154b, 157b, for registration with the orifices 148a, 154a, and 157a of plate 127. Disposed to register with orifice 153a of plate 127 is orifice 153b, and disposed to register with orifice 155a of plate 127 is orifice 155b, these orifices being of the necessary dimensions and length to perform the necessary purposes as already indicated. Plate 126 includes an orifice 156b and an orifice 151b for registration, respectively, with the orifices 156a and 151a of plate 127. Orifices 156b and 151b of plate 126 are interconnected by a passageway 159 and are disposed on a removable insert 161 for a purpose to be described. The arcuate elongated orifice 148b, 154b, 157b of plate 126 may have any contour desired but the one shown is meaningful in that this orifice must avoid communication or registration with any of the other orifices of plate 127 and subsequently plate 125 in order for the proper functioning to occur. It will also be understood that the adjacent surfaces of plate 127 and 126 are cemented together to form a unitary structure providing passageways only where the coincident orifices exist.

Centrally of the plate 126 is a central aperture 147b which communicates with the central apertures already described.

In FIG. 19D there is shown the plate 125 which has orifices therein as will be described to perform the purposes as already described in connection with the registering orifices of plate 126. Thus in FIG. 19D, stationary plate 125, orifice 145d registers with orifice 145c, orifice 152c registers with orifice 152b, orifice 148c registers with orifice 148b, orifice 153c registers with orifice 153b, orifice 155c registers with orifice 155b and orifice 156c registers with orifice 156b. The adjacent faces of plate 125 and plate 126 are disposed together and cemented to each other thereby providing passageways wherever the orifices register and providing a totally water tight seal at all other points. Of course there is the central aperture 147c.

The piece 161, or insert, is removable and is modifiable in the original construction of the regenerating valve to provide for the desired amount of water flow during regeneration. The insert may be made removable even though other portions of the plate 126 are cemented to the adjacent plates.

Referring to FIGS. 15, 18 and 19, it will be recalled that plate 125 is disposed against the base 135 to which conduits are attached for conducting flow of regeneration water. Thus as has already been described orifice 145d of plate 125 is connected to conduit 145e. Similarly orifice 152c is connected to conduit 152d, orifice 148c is connected to conduit 148d, orifice 153c is connected to conduit 153d, orifice 155c is connected to conduit 155d and orifice 156c is connected to conduit 156d. The other ends of the conduits referred to immediately preceding will be further described in connection with their operation of the control cylinder 54 and other apparatus as will be subsequently made clear in this specification.

Since the adjacent surfaces of plate 125 and plate 126 are cemented to each other there will be no passageways in the composite device except those defined by the orifices and passageways described. Correspondingly in the final structure the plate 125 may be cemented to the base 135 to form a composite structure, although this need not be the case unless desired.

For the composite structure of the regenerating valve portion 123 as illustrated in FIG. 18 it may be considered that the plates A, B, C and D are placed on top of each other and cemented together over the total of their adjoining surfaces. Referring to FIG. 18 it may be considered that the same plates 128, 127, 126 and 125 are pushed together to form a unitary piece. The pathways through this structure after making the composite is achieved, may be further visualized by considering the appropriate portions of FIG. 20.

In the series of sectional views shown in FIG. 20 and FIG. 20 continued the water passages are shown. In considering these figures along with FIG. 19 it should be remembered that the source of water operating through this valve comes from orifices 139, 141 and 142 of plate 129. Thus, if these orifices are not adjacent any others that can receive the flow therethrough nothing is achieved in illustrating additional structure of the plate members 128, 127, 126 and 125. Thus, for example, in FIG. 20-1 which represents the situation when the rotary plate 129 is disposed in position 1 of plate 128, since orifices 139, 141 and 142 are no where else on the periphery of plate 128, there is no point in illustrating the other half of the composite structure. In FIGS. 20-1 to 20-8, it is considered that the plates 125, 126, 127 and 128 are cemented together and that plate 129 is disposed thereagainst in the appropriate operative position, for example, position 1 for FIG. 20-1. The FIGS. 20-1 to 20-8 are on a larger scale for clarity than the other figures relating to the relevant parts.

Thus, as may be observed in FIG. 20-1, there is a passageway from orifice 139 of rotary plate 129 and from orifice 145a of plate 128 through orifice 145d of plate 125. The other apertures or orifices 144, 146, 146a, 146b and 159 provide no passageway. The central aperture 143, 147 of course is there.

FIG. 20-1' is a sectional view taken through the composite structure at the orifice 152, 152a, 152b, and 152c when the plate 129 is in position 1, that is to say at the start. In this condition the plate 129 blocks any passage at 152a. However, orifices 152a, 152b and 152c align with each other and thus provide an opening from 152c through conduit 152d to the appropriate portion of control cylinder 54. Since the groove 146b, 152b extends angularly as shown (FIG. 19C) there is a connection from orifice 152c to orifice 146b, to orifice 146a, to rectangular orifice 146 and thus to rectangular groove 144 to the drain. Hence in the starting position of the rotating plate 129 there is a drain passage from orifice 152c to the central aperture 143,147 for drainage purposes to be subsequently described.

In FIG. 20-2 the cross-sectional view shown is of the composite valve where the leading edge of orifice 142 is engaging the initial edge of orifice 148 and for this condition it is assumed that the orifice 139 has left the orifice 145a. This is position 2, FIG. 19A. Because there is water flow through orifice 142 and orifice 148 the meter keeps running because flow is taking place. The flow under this condition may be traced in FIG. 20-2 from orifice 142 of plate 129 through orifices 148, 148a, 148b and 148c respectively of the plates 128, 127, 126 and 125. This flow continues through conduit 148d to the rotary valve 36. While flow is possible through the passageway just described in FIG. 20-2 which is backwash flow through conduit 148d, conduit 82 to rotary valve 37 and through tank 32, the return of the backwash flow comes from rotary valve 37, conduit 84 and conduit 156d, to the orifice 156c as shown in the sectional view FIG. 20-2'. Thus the sectional view taken at orifice 156c while the rotary plate 129 is at position 2 goes through orifice 156c of plate 125, through orifice 156b, passageway 159, orifice 151b, orifice 151a of plate 127, and orifice 151 of plate 128 through rectangular slot 144 to the central passageway 143, 147.

In position 3 of the rotary plate 129 the orifice 139 of the rotary plate 129 registers with the initial edge of orifice 152 of plate 128. FIG. 20-3 illustrates the sectional view taken at position 3. Thus the orifice 139 of rotary plate 129 registers with the orifice 152 of plate 128, the orifice 152a of plate 127, the orifice 152b of plate 126, and the orifice 152c of plate 125. The orifice 152c communicates with conduit 152d which extends to the control cylinder 54.

Also at position 3 the orifices 141 and 142 of rotary plate 129 register with orifice 148 of stationary plate 128 and thus through the orifice 148c of plate 125 to conduit 148d as described in connection with FIG. 20-2. However, the section at position 3 also includes the orifice 149 of plate 128. In this view there is shown the dotted line 162 representing the groove on the back of plate 128 connecting the orifice 145a and the orifice 149 (FIG. 20-8). Also at position 3 return flow comes through orifice 156c and thus the sectional view 20-3' represents the cross-sectional view through the valve at position 156c. This is the same as FIG. 20-2' and thus will not be further elucidated, the reference characters on the two views being identical.

The sectional views after position 3 do not change significantly until position 4 (FIG. 20-4) is reached, the effects of reaching the ends of orifices 148, 149 and 152 will become clear subsequently in this specification. At position 4 the orifice 139 of plate 129 registers with the beginning of orifice 153 through which orifices water is supplied to the brine introducing conduits and orifices and for a relatively slow continuation of the backwash.

Since flow involving arcuate orifice 153 does not involve the central aperture 143, 147 in FIG. 20-4, the central aperture is indicated by the dot-dash lines 143, 147 and the condition shown utilizing arcuate orifice 153. Thus the sectional view of FIG. 20-4 may be considered to be taken in the direction of arrows 20-4 of FIG. 19A. Thus as seen in FIG. 20-4 the orifice 139 of plate 129 registers with the arcuate groove 153 at one end thereof and the other end of the arcuate groove, or orifice 153, registers with the orifice 153a of plate 127, the orifice 153b of plate 126 and the orifice 153c of plate 125. The orifice 153c is connected to conduit 153d and to the brine introducing apparatus which will be subsequently described.

During the flow through arcuate orifice 153 from position 4 forward, there is of course return flow from the regeneration tank which takes place through orifice 156c of plate 125. Thus the sectional view showing the conduit passageways through the various plates is the same as for FIGS. 20-3' and 20-2'. Accordingly no further elaboration of the sectional view 20-4' will be made.

During the movement of the rotating plate continuing from position 4 of the rotating plate 139 it will be observed that the orifices 141 and 142 of plate 129 do not engage or register with any other orifices.

The next significant position of the rotary plate 129 is position 5 when the orifice 142 engages the beginning of arcuate orifice 154. Orifice 139 does not register with any other orifices at this stage. The sectional view for this condition is shown in FIG. 20-5.

View, FIG. 20-5, may be said to be skewed in that it represents different sectional lines in the plate 126 as compared with the other plates in order to illustrate the effect of the arcuate groove 157b, 154b, 148b. This is done in order to avoid an undue multiplicity of sectional views to illustrate the direction and the passageway of flow. Thus in FIG. 20-5 the orifices 142 and 141 of plate 129 register with the orifice 154 of plate 128 which registers with orifice 154a of plate 127. The orifice 154a registers with orifice 154b of plate 126 which as may be seen in this plate is a continuation of orifice 148b. The orifice 148b registers with orifice 148c which is connected to conduit 148d for conducting liquid through a pathway already described. Since in FIG. 20-5 the pathways do not include the central aperture 143, 147, this is illustrated only by the dot-dash line 143, 147.

Return flow for the flow through orifice 148c comes through orifice 156c as already described and thus the sectional view FIG. 20-5' taken at orifice 156c is the same as the preceding FIGS. 20-4', 20-3', and 20-2' and will not be further commented on.

The next significant position of the rotating plate 129 occurs at position 6 when the orifice 139 engages the beginning of arcuate orifice 155 of stationary plate 128. At this point the orifices 142 and 141 do not flow register with any other orifices. Thus as seen in FIG. 20-6 orifice 139 registers with orifice 155 of plate 128 which registers with orifice 155a of plate 127, which registers with orifice 155b of plate 126 and which registers with orifice 155c of plate 125. The orifice 155c is connected to conduit 155d which extends to the control cylinder 54 for purposes as will be described. Since the flow taking place through orifice 155c, which is for brine make-up water, does not go to the regeneration tanks, there is no return flow and thus no need for showing a sectional view similar to sectional view 20-4'.

The next significant position of the rotating plate 129 is position 7 which is the position initiating the purge or rinse phase of the regeneration process. This involves the relatively long and relatively large in cross-sectional section arcuate orifices 156 and 157. The sectional view for the valve parts at position 7 is shown in FIG. 20-7.

Position 7 is taken somewhat farther along the direction of rotation of plate 129 in order to illustrate the principal effect. The tapered initial end of arcuate orifice 156 enables purge flow to begin relatively slowly but does not alter the basic structure of the pathway through the valve member. It will be recalled that the radial extent of orifice 156 is such as to take the radial extent of orifices 139, 141 and 142. Referring to FIG. 20-7 the orifices 139 and 141, 142 of plate 139 register with the arcuate orifice 156. The arcuate orifice 156 extends arcuately and along its extent it registers with the orifice 156a of plate 127. Orifice 156a registers with orifice 156b of plate 126 which in turn registers with orifice 156c of plate 125. Flow from orifice 156c takes place through the conduit system as already described. The sectional view of FIG. 20-7 is skewed, in a sense, also in that the sectional view follows along the lines (20-7)-(20-7) of arcuate groove, or orifice, 156.

Since there is outflow through orifice 156c for the condition illustrated in FIG. 20-7 there is also return flow through orifice 148c as already described. However, in this instance the return flow has a different pathway through the valve member 123 and this pathway is shown in the sectional view 20-7'. See also direction of arrows (20-7')-(20-7') of FIG. 19A. Thus the orifice 148c of plate 125 communicates with the upper end 148b of orifice 148b, 154b, 157b. The lower end 157b of this combined orifice of plate 126 communicates or registers with orifice 157a of plate 127 which in turn communicates with the arcuate orifice 157 of plate 128 which finally communicates with rectangular groove 144 and thus with central aperture 143, 147 to the drain system.

As has already been indicated the plates 131 and 132 are cemented together and to plate 129. The diameter of plate 131 is such that it covers the outer extremity of the rectangular groove 144 but terminates short of the orifices 141 and 142. Thus the plate 131 defines the fact that orifices 139, 141, 142 are passageways through the plate 129, and the rectangular orifice 144 and aperture 143 define an interior passageway. The central opening 163 in plate 131 is an opening of a size to just easily receive the hollow shaft 137 which drives the member 129.

The drive mechanism 133 comprises the plate structure 132, a pawl and ratchet mechanism including the teeth or serrations 164 and a spring biased pawl 165. This drive mechanism may take any form and, for example, the plate 132 may comprise two plates 166 and 167 with the teeth or serrations 164 disposed on plate 167 only and not on the plate 166. The pawl 165 may be pivotally supported as shown between a pair of rings 168 and 169 and a spacer 171 between them. The spacer 171 and the rings 168 and 169 are cemented to each other to form a rigid structure and each of the rings 168 and 169 includes a tab 172 through which a pivot pin 173 extends.

As may be seen best in FIG. 18B there is a flat coiled spring 174 wrapped around the spacer 171 with the free end 175 of the spring lying against the undersurface of the pawl 165. The rings 168 and 169 are firmly attached to the end of the shaft 137 so that when the shaft rotates it rotates the rings 168 and 169 and the pawl 165 with them. The pawl being engaged against the innersurface of the teeth 164 accordingly drives the plate 132 and with it plates 131 and 129. Formed in the plate 131 are through openings 176 which register with partially through openings bearing the same reference character 176 in plate 129. However the bottom of the openings 176 in plate 129 form anchors for receiving the legs of a yoke member 177 (FIG. 15). The ends of the yoke member being thus anchored to plate 129, rotating the yoke manually will rotate the plate 129 as desired.

Referring to FIG. 15 it will be seen that the yoke 177 has an extending actuating arm 178 which projects through the outer cover 136 and terminates in a pin 179. Between the pin 179 and the hub 181 of pointer 182 is a spring 183. Whenever it is desired to change the location of the rotating plate 129 it is necessary only to rotate the pointer 182, for example, as seen in FIG. 16 between the positions of service and backwash. Rotating the pointer 182 which is attached firmly to the arm 178 rotates the yoke 177 and thus the rotating plate 129 for adjustment, or service, purposes as will become clear.

DRIVE MECHANISM OF VALVE STRUCTURE 53

The overall drive mechanism of the valve structure 53 may be understood by considering FIG. 15 in which the water turbine 122 is shown generally. It will be understood that such water turbines are well-known in the art and any form thereof may be used. In this form soft water enters through the opening or aperture 184 and engages the turbine wheel 185 which through a gear train 186 drives a housing 187. The final gear of the train 186 is shown as gear 188 attached to housing 187.

The housing 187 may be circular in general and has a series of four apertures 189 through which water from the interior of the turbine housing may flow under the pressure of water entering through aperture 184. The housing 187 is enclosed and interiorly thereof there is a second housing 191 which, for example, may be cross-shaped as seen best in the sectional view of FIG. 17. The cross-shaped housing 191 has four members, each of which includes an aperture 192 which aperture, in general, conforms to the size of the aperture 189 of the outer housing. The exterior of the housing 191 is connected to the left end of the shaft 137 as may be visualized best in FIG. 15. Then as the housing 191 rotates it rotates the hollow shaft 137 which in turn rotates the drive structure 133 which drives the rotating plate 129.

The housing 136 of the valve structure is attached to and supported by the housing of the water turbine 122 by any sort of shaft constructure 193. The shaft 193 is hollow and provides a drain opening D from the interior of the valve structure. Thus water flows through the turbine 122 through the hollow shaft 137 into the space 138 and whenever water flows inwardly from the conduit as indicated it will flow into the drain passageway, or conduit, 143 and to the drain D as will become clear.

Interiorly of the housing 187 is a series of four tension springs 194 attached to the housing 187 at one of their ends and to the subjacent one of the arms of housing 191. Driving of the outer housing 187 by the gear 188 actuated by the turbine 122 pulls the cross-shape housing 191 along with it, the springs 194 being attached at their front ends to the housing 187 and at their rear ends to the parts of the cross-shaped housing. Thus the housing 191 rotates clockwise and the rotating plate 129 also rotates clockwise.

PRESSURE REGULATOR OF VALVE STRUCTURE 53

The construction of housing 187, the housing 191, the hollow conduit 137 connecting the interior of housing 191 with the interior space 138, the spring 183 tending to urge the rotary plate 129 outwardly, and the interface space 134 between the rotatable plate 129 and the stationary plate 128 form a pressure and flow regulating mechanism.

This may be understood as follows: water flowing in through the apertures 189 and 192 and the hollow shaft 137 into the space 138 exerts a pressure against the overall surface of the rotatable plate 129. This pressure forces the plate 129 against the adjacent surface of plate 128 thereby providing virtually no clearance; i.e., a relatively tight seal between these surfaces and a substantial amount of friction. If this friction is too great, the plate 129 and the connected structure 124 will tend to slow down thereby causing the housing 187 to stretch the springs 194 in the effort to drive housing 191. Stretching of the springs results in a relative shifting of the housings and a closing of the openings between the orifices 189 and 192, thus decreasing the flow of water therethrough and into the space 138. Such decreased flow lessens the pressure against the valve plate 129, thereby permitting the spring 183 to urge the plate 129 away, slightly, from the plate 128. It also tends to increase slightly the interface space 134, thus tending to decrease the friction slightly. In effect, it enables the housing 191 to catch up, in a manner of speaking, with the housing 187. If the pressure decreases sufficiently, the friction in the interface space 134 will decrease enough so that the housings 191 and 187 will position themselves to maintain the openings 189 and 192 at the maximum. Thus it may be seen that the flow through the meter 121 will regulate itself to an optimum valve as called for by the service requirements.

CONTROL CYLINDER

During the description of the regenerating, or distributing, valve structure, FIG. 15 etc., numerous references were made to the control cylinder 54 and its relationship to the functioning of the regenerating valve.

The control cylinder and its parts are specifically illustrated in FIGS. 10, 11, 12, 13 and 14. Reference thereto may now be had. Diagrammatically the control cylinder 54 and its parts are also illustrated in FIG. 2. The control cylinder 54 comprises a cylindrical housing 195 closed at one end with a cover 196 and at the other end with an over-center or snap-acting device 197. The walls of the cylinder 195 may be made of any suitable synthetic tubing, for example nylon, and the pistons therein may be made of similar material. Depending upon the dimensions of the pistons and the functions to be performed each of them has either one or two "O" ring gaskets 231 thereon which seals the space between the pistons and cylindrical surface from the leakage of water.

Interiorly of the cylindrical housing 195 are pistons 198, 199, 201, 202, 203, 204 and 205. Disposed in the wall of the cylindrical housing, in addition to ports 105, 117 and 118 are a series of ports 208, 209, 211, 212, 213, 214, 215, 216 and 217. Connected to the ports, as listed respectively, are the conduits 103, 55, 119, 221, 222, 224, 225, 226, 227, and 228.

The positions of the various pistons and the various ports of control cylinder 54 are shown (FIG. 10) in one operating position of the cylinder which is that when, for example, the tank 33 is providing service and the tank 32 is being, or has been, regenerated and is being held in abeyance until tank 33 is exhausted, whereupon tank 32 is called upon to supply soft water while tank 33 is regenerated.

The piston 201 in the position shown (FIG. 10) closes the orifice 209 and opens the orifice 208. This piston is connected to an operating pin 232 which extends through a hollow plunger 223, the pin 232 having a head 234 thereon for engagement by the operating lever 235. The hollow plunger 233 is connected to pistons 198 and 199 for operating them as will be explained. The piston 199 in the initial position closes orifice 117 and opens orifice 118. Piston 198 seals the space between itself and piston 199 and provides a closure for the upper end of the cylinder. The snap-acting, or over-center, mechanism 197 is attached to the upper end of cylinder housing 195 adjacent the piston 198. The over-center mechanism 197 comprises a housing 236 which has a central opening through which the plunger 223 may readily move. The housing 236 has hollow portions therein it with a pair of springs 237 disposed at one of their ends. At the other ends of the springs are a pair of bars or links 223 which bear against receiving grooves in the surface of plunger 233.

Figures 11, 12, 13, 14:
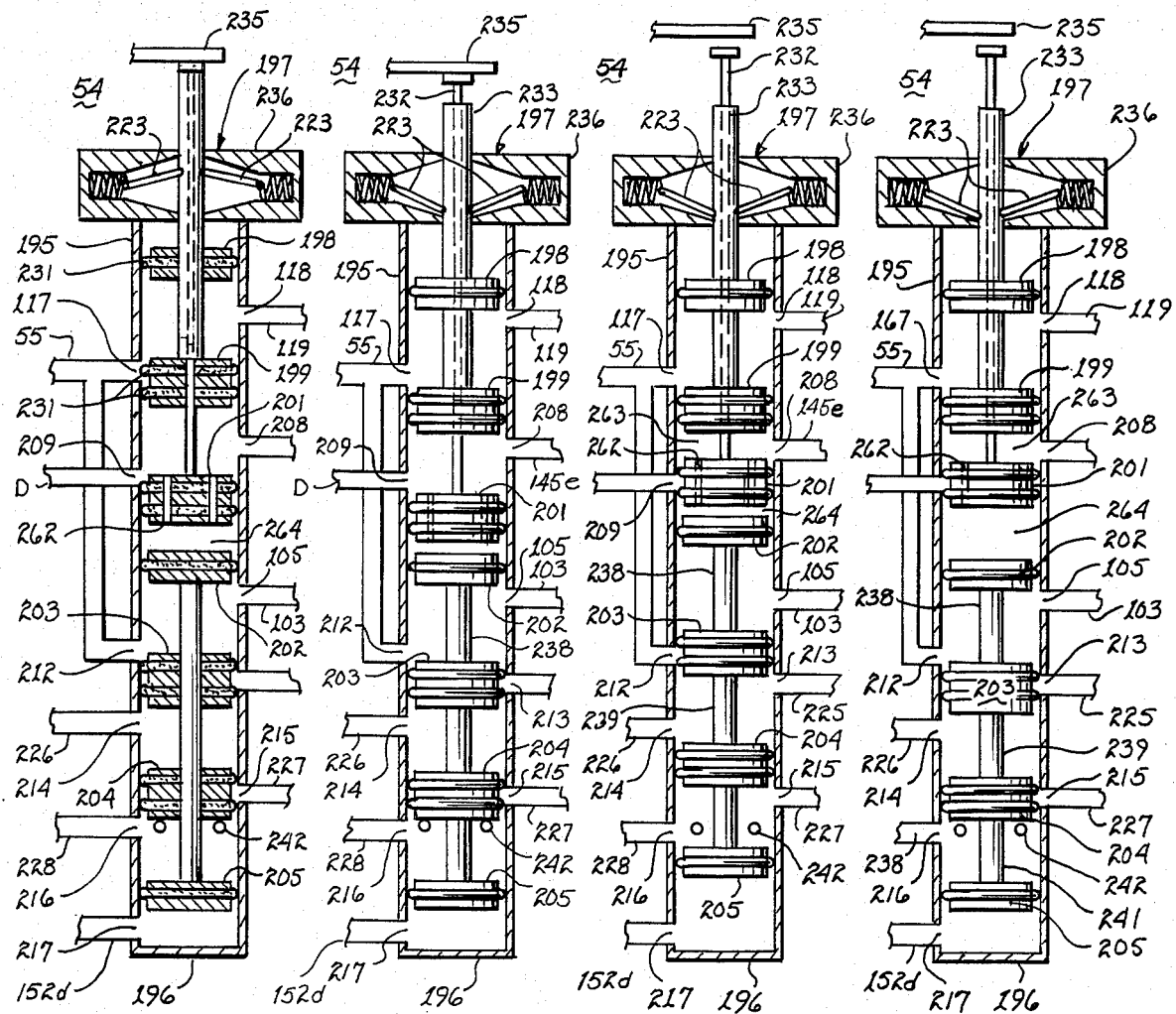
FIGS. 11, 12, 13 and 14 are sectional views similar to a portion of FIG. 10 illustrating various operating conditions of the control cylinder.

As may be visualized in FIG. 10, when the plunger 233 moves downwardly the links 223 will compress the springs 237 and, when the links 223 are essentially horizontal any further movement downwardly of the plunger 233 will cause it to snap down into the next position which may be seen in FIGS. 12, 13 and 14. Similarly in the reverse direction, when the links 223 are downwardly positioned and the plunger 233 is moved upwardly, the links will cause the plunger to move relatively slowly until the links are horizontal whereupon with a snap-action, they will assume their upper positions along with the plunger 233 and the associated pistons. As may be observed in FIG. 10 the head 234 of operating pin 232 adjacent to operating lever 235 is spaced away from the upper end of the plunger 233. This is so that the pin 232 can move downwardly some distance before the plunger 233 is actuated by the lever 235. The piston 201 is enabled to open the orifice 209, possibly, slightly before the piston 199 opens the orifice 117, but it enables the pistons 199 and 201 to move relative to each other in one operating position of the structure as will be made clear.

The pistons 202 and 203 are connected by a spacer 238 so that they move together and pressure does not separate them. Pistons 203 and 204 are separated by a spacer 239 which is not connected at one end so that separation can take place under some circumstances. Also, spacer 241 is connected between pistons 204 and 205 for those pistons to move together and not become separated. Near the lower end of the housing 195 there are a pair of pins 242 which determine the lowermost distance that the piston 204 can go and prevent the piston 205 from moving out of the chamber in which it is shown. The pins 242 may be pins extending all the way across the cylinder instead of just pins jutting in from one side.

OPERATION OF THE SYSTEM

The remaining structure of the control cylinder 54 and the functioning therewith of the regenerating valve structure 53 may now be developed in connection with an explanation of the system during operation.

For this purpose, continue the assumption that the tank 33 is providing service, that the tank 32 has been regenerated and is awaiting call to service, and that the water meter 44 has turned a sufficient number of times to cause the meter wheel 112 to have turned the spoked wheel 109 a sufficient number of times to bring the arcuate orifice 96 into communication between conduit 101 and conduit 103 (FIG. 2). Consider also (FIG. 2) that soft water pressure exists always at port 212 of cylinder 54 through conduit 224 and conduit 55 from the user supply line 49. This water pressure also exists at port 105, and through conduit 103 at the meter valve 42. Hence pressure exists under piston 39 which functions and causes the operating lever 235 (link 38, 116) to change the positions of the rotating valves 36 and 37 as has already been described. This causes the tank 33 to be taken from service, and the tank 32 to be put into service. It also initiates the recharging or regeneration of tank 33. The ensuing description is concerned principally with the regeneration cycle as applied to tank 33. At the instant of change, all of the parts of control system 35 are stationary and no water is flowing in conduits 55 and 119 because piston 199 is blocking orifice 117.

As the lever 235 (116) moves downwardly the head 234 engages the top of plunger 233 and thereafter the pin 232 and plunger 233 move together. In FIG. 11 it will be seen that the piston 199 has moved downwardly as has the piston 201. The downward movement may be noted also by comparing the position of links 223 as between FIGS. 10 and 11. The passage between ports 117 and 118 is about to be opened and the passage between ports 209 and 208 also is about to be opened. As the lever 235 moves downwardly still further as seen in FIG. 12 the snap-acting device members 223 have moved downwardly and the hollow plunger 233 has moved downwardly to its full extent as has the operating pin 232. The pistons 198, 199 and 201 now assume the position shown in FIG. 12. The passageway from port 117 to port 118 is now open and the passageway through ports 209 and 208 is also open. Hence water flows from user supply line 49 through conduit 55, port 117, port 118, and conduit 119 to the water turbine 122 through opening 184 (FIG. 15). Water pressure now exists through the passageway consisting of the water turbine 122, the hollow shaft 137 and the space 138 of the rotating valve 121.

Flow cannot take place, however, unless a drain opening is provided. Such a drain passageway exists by noting that the piston 201 has moved downwardly (FIG. 12) opening the passageway between ports 209 and 208 (at the same time as the piston 199 moved downwardly). The port 209 is connected to drain D and port 208 is connected through conduit 145e to orifice 145d of plate 125 (FIGS. 18 and 19). Through the pathway described in connection with FIGS. 18, 19 and 20 it will be recalled that in position 1 of the rotating plate 129, water may flow through orifice 139 to orifice 145d and thus conduit 145e. Hence water flows through the turbine 122 causing it to rotate and thereby begin to drive the rotating valve member 129. It will be noted that the orifice 145a of plate 128 is elongated so that as the rotation takes place, the passageway exists through the parallel plate valve structure for the water to flow for a period of time determined by the length of orifice 145a. This situation continues until the moving plate 129 reaches position 2 when orifice 142 reaches orifice 148 (FIGS. 18 and 19). Backwashing now starts and continues for the extent of orifice 148.

The backwash taking place through orifice 148 is at a relatively high rate for fluffing up of the mineral in the tank being regenerated, for example tank 33, in order that all of the accumulated debris etc. can be washed away but the flow is not of such magnitude that the mineral will be washed out of the tank through the backwash system.

The pathway for the backwash water may be traced at this juncture as follows, bearing in mind that the rotary valves 36 and 37 have been shifted so that the tank 32 is providing service and the tank 33 is connected for regeneration.

In FIG. 2, for this condition, the service water flow through the rotary valves 36 and 37 takes place according to the dotted arrows 243 and 244. This may be visualized by noting in FIGS. 7 and 9 that the movable plates 62 and 64 are in the position at right angles to those shown in these figures as has been previously indicated. Thus, service water flows from conduit 45 through rotary valve 36 according to arrow 243, conduit 51, into the top of tank 32, flowing downwardly therein which is to say regular flow, out through conduit 52 into rotary valve 37, through this valve according to arrow 244, through conduit 48 and the water meter 44 to service conduit 49. The downflow taking place in tank 32 causes the hardened water to mix intimately with the mineral in the tank thereby assuring the best contact of the hard water with the mineral to remove the hardening ingredients as is well understood.

The path for the backwash flow of soft water takes place from service conduit 49 through conduit 55, ports 117 and 118, see FIG. 12, conduit 119 (water turbine 122), opening 184, hollow shaft 137 and into space 138 of the rotary valve 121, and then through orifices 142, 141, orifices 148 and 148c as already described, conduits 148d and 82, orifice 73 of stationary plate 63, arcuate orifice 86 of movable plate 64, orifice 71, and conduit 47 into tank 33. This is in a counterflow, or upflow, direction, exiting the tank 33 at the top thereof through conduit 46, orifice 66 of stationary plate 61 of rotary valve 36, arcuate orifice 68a, orifice 68 of stationary plate 61, and through conduits 84 and 156d to the orifice 156c. Then through the stationary plate valve 121 through a pathway described earlier in this specification and central aperture 143 etc. to the drain D. This flow as visualized in tank 33 in counterflow or upflow for best backwashing conditions and is at a relatively high rate for fluffing up of the mineral as described but not at such a rate that the mineral is washed out through the top of tank 33.

The backwash flow described immediately previously continues while the rotating plate 129 rotates until the orifice 141 leaves the end of orifice 148.

During the backwash portion, or phase, of the regeneration cycle when arcuate groove 148 is functional the chamber 263 between pistons 199 and 201 is filled with water. During the backwash cycle (FIG. 12) the piston 205 moves upwardly and moves piston 201 toward piston 199 and in the process closes the port 209. The water in chamber 263 then needs a place to go for the piston 209 to move upwardly fully. This avenue is provided through port 208 which connects with conduit 145e and thus through the passageways already described to arcuate slot 145a. Then through the shallow groove 162 (FIG. 20-8) it reaches the arcuate groove 149 which is connected to the rectangular groove 144 and the drain 143.

Continued movement of orifice 139 from position 2 causes it to register with the arcuate orifice 152 at position 3. At this point, the condition of the control cylinder 54 is that shown in FIG. 13 to which reference should now be had in connection with the other figures, more particularly, FIG. 20-3. The registry of orifice 139 with orifice 152 (FIG. 19A) provides a pathway through rotary valve 121 as already described and through conduit 152d provides water pressure below piston 205 in the condition of FIG. 12 causing piston 205 to move upwardly as seen in FIG. 13, being stopped in its upward movement by the pins 242. Movement upwardly of piston 205 causes piston 204, 203, and 202 to move upwardly also as shown in FIG. 13. Piston 203 now blocks orifice 212 thereby discontinuing flow through port 105 and blocking flow through conduit 103 to the entry port of meter valve 42.

While the rotating plates 93 and 94 of meter valve 42 continue rotating because soft water is being supplied through meter 44, when there is no water pressure available through conduit 103, the piston 39 of operating cylinder 41 can not moved and it remains in the position it is in. Concomitantly the rotary valves 36 and 37 remain disposed in their positions as of this instant for this condition of the system. In other words, the rotary valves cannot switch from one tank to the other while the meter valve 42 has no pressure supplied to it. Accordingly the system will not switch in the reverse direction from a service tank to a tank being regenerated during the regeneration cycle.

Movement upwardly of pistons 203 and 204 (FIG. 13) opens the port 213 and 215, thereby providing passageways between ports 214-213 and ports 216-215. The passageway between ports 214 and 213 is one of the passageways leading to the introduction of brine into the tank 33 for regeneration purposes. Thus the port 213 is connected through a conduit 246 to the asperating port 247 of a venturi device 248 and the port 214 is connected through conduit 249 through a ball check valve 257 to the brine intake 251 disposed in the salt storage and brine formation tank 34. The brine intake mechanism 251 includes a further ball check valve 252 to prevent the sucking of air when the brine level 253 drops down to the level of the brine intake device 251. The brine level 253 may be established as by a screen in the tank 34 holding the granular salt 254 above the brine level at a point desired as it is well understood. The remaining conduits for the introduction of brine will be described subsequently in this specification.

The passageway between open ports 216 and 215 (FIG. 13) establishes a conduit system for the introduction of make-up water for brine formation, including the conduit 155d extending from port 215 to the valve 121 and the conduit 255 extending from port 216 to the salt 254 of brine container 34.

While the orifice 139 of plate 129 remains in registry with orifice 152 of plate 128 no flow takes place through the brine introduction and brine make-up pathways and described. The registration of orifices 139 and 152 creates in incipiant operating condition. Upward movement of the piston 205 under consideration in connection with the position shown in FIG. 13 has, differing from FIG. 12, the piston 202 engaged with the undersurface of piston 201 causing it to move upwardly into the position shown in FIG. 13. This movement causes operating pin 232 to move upwardly through the hollow plunger 233 which remains in its position as determined by the links 228. The upward movement of pin 232 causes the head 234 to move the operating lever 235 to the upward position as shown. The pistons 198 and 199 of FIG. 13 remain in the positions as shown in FIG. 12 because the plunger remains stationary. Movement upwardly of the piston 201 closes port 209 thereby closing the drain opening to valve 121 through port 208 and conduit 145e. Closing of this drain port is significant in a subsequent operation of the control cylinder 54 but the drainage that is necessary for the operation of the valve 121 occurs through the central aperture 143, etc. Water for the regeneration operation continues through ports 117 and 118 unabated.

When the orifice 139 reaches the terminus of orifice 152, water pressure is removed from conduit 152d and orifice 217, but the piston 205 and those connected with it remain in the position shown in FIG. 13 inasmuch as there is no pressure in the control cylinder 54 to change this condition. The brine water make-up avenues and the brine injection conduits remain open.

As the rotating plate 129 approaches position 4 (FIG. 19A) and the orifice 139 registers with the beginning of arcuate orifice 153, the orifice 141 is about to leave the arcuate orifice 148 to terminate the backwash phase and to initiate the brine introduction phase by the registration of orifice 139 and 153.

As the orifice 139 registers with orifice 153, it is assumed that the backwash phase has ended, that is, the orifice 141 has left the terminus of orifice 148. Communication is established for brine introduction as will now be described. Water pressure exists in the space 138 of the rotating valve 131 and this pressure forces soft water through orifice 139 and arcuate orifice 153 through to conduit 153d in a pathway as already described and from conduit 153d through the venturi device 248 picking up brine through the asperating port 247 and continuing through conduit 256 and conduit 82 to orifice 73 of the stationary plate 63 of rotating valve 37. From orifice 73 the brine which has been asperated through the circuit described enters the tank 33 through valve 37 and conduit 47. The resulting flow exits the tank 33 through conduit 46 and through rotary valve 36 (orifice 68) to conduit 84 and conduit 156d to the valve 121. The flow through the valve 121 through the pathway previously described flows out to the drain as shown.

The asperation of brine through the circuit described continues until all of the brine has been exhausted and the ball check valve 252 closes to prevent the sucking of air. This may occur somewhere along the line of the passing of orifice 139 along arcuate orifice 153 as determined by the initial installation which determines the amount of brine to be utilized. Continuation of the rotation of orifice 139 along the orifice 153 causes the continuation of soft water introduction through the conduit system earlier described to further backwash the tank 33 at the relatively slow rate which is that of brine introduction or thereabouts. This flow in tank 33 is counterflow or upflow to rinse or purge the salt, or brine, from the tank in accordance with well understood principles.

The brine introduction having stopped the relatively slow backwash continues until the orifice 139 reaches the terminus of arcuate orifice 153 which is to say, in effect, at the position 5 (FIG. 121A). At this point the orifice 142 engages the beginning of arcuate orifice 154 and flow through valve 121 continues. The orifice 154 is a backwash orifice at the relatively high rate and backwash flow continues through the orifices in the plates of valve 123 as has been described and from that portion 148b of the orifice 148b, 154b, 157b, the backwash flow continues through tank 33 in the circuit as has already been described. During the movements of orifice 139 toward the latter portion of orifice 153 and for the movements of orifices 141 and 142 in registry of orifice 154 no further movements of the pistons inside of the control cylinder 54 has taken place.

When the orifice 139 moves to position 6 where it registers with the arcuate orifice 155 the orifice 141 has moved away from the terminus of arcuate orifice 154 thereby discontinuing this second phase of the backwash. But, through the registration of orifices 139 and 155 flow is established through the circuit as previously described through valve 123 and from orifice 155c, through conduit 155d to port 215 of control cylinder 54, and from port 216 of the control cylinder through conduit 255 to the brine make-up water injection to 259. Thus soft water is introduced into the brine chamber 34 through the tube 259 which is spaced above the brine level 253 by a certain distance which as is well-known, prevents the formation of a bridge or chamber in the salt 254 above the brine level. The time of introduction of brine make-up water into the container 34 is determined by the length of the arcuate orifice 155 fixed at the construction of the device for particular circumstances. When the orifice 139 leaves the terminus of the arcuate orifice 155 the brine water make-up phase is ended.

For purposes of adjustment of the apparatus for individual circumstances, the arcuate orifices 154 and 155 may be disposed on a removable segment 261, this being part of the plate 128. Thus, if it is desired that the second backwash phase as determined by orifice 154 should be slightly longer the length of time that make-up water is introduced into the system would be made somewhat shorter or the reverse could occur. Once a system has been installed, the segment 261 would not be contemplated as being necessarily removable but it is insertable at the time of installation thereby making the apparatus versatile to accommodate different circumstances.

Under some circumstances blockage may prevent water from exiting the venturi 257 freely causing pressure to back up through the brine injection line 249 but undesired flow into the salt storage tank 34 is prevented by the one-way ball check valve 257.

As the orifice 139 and the orifices 142 and 141 reach the arcuate orifice 156, in effect, position 7, the purge or rinse flow at a very high rate takes place. The cross-sectional area of the orifice 156 and the combined cross-sections of the orifices 139, 141, and 142 are such as to permit this high rate of flow. As already described, the flow through valve 123 takes place, and from the orifice 156c flow takes place through conduit 156d to orifice 68 of rotary valve 36. Then from arcuate orifice 68a through orifice 66 and conduit 46 to the upper end of the tank 33 in a downflow or normal flow direction. Exiting takes place through conduit 47, orifice 71 of rotary valve 37 through arcuate orifice 73, conduits 82 and 148d to the orifice 148c of valve 123 and through this valve to the drain. The high rate purge, or rinse, flow taking place comes through the valve 123 as has been described to arcuate orifice 157 (FIG. 19A) and from this orifice it exits into the center drain aperture 143, etc. All of this flow involving arcuate orifices 156 and 157 takes place without the pistons in the control cylidner 54 making any changes.

During the purge or rinse phase of the regeneration cycle that has just been described, it will be noted that the flow in tank 33 has been downflow which is to say in the same direction as service flow. This flow is very heavy because of the size of the orifices 156 and 157, and it tends to compact the mineral in the tank and it causes intimate contact of the hard water with the mineral as it moves through the mineral bed. Good softening is thereby achieved.

When the rapid backwash occurs as it does when the orifice 154 is in the circuit the mineral is fluffed. Remaining salt water pockets, or brine pockets, if any, that remain are eliminated because there is no compacting of the minerals left after this phase takes place.

Continued rotation of orifice 139 and orifices 141 and 142 takes these orifices away from arcuate orifice 156 and brings the orifice 139 into registry with the arcuate orifice 145a at the initial position 1. In this position the orifices 141 and 142 are not in registration with any other orifices and through them no flow takes place. Flow through orifice 139 and 145a and further through the valve 123 takes place as already described to orifice 145d and conduit 145e to port 208 of cylinder 54. At this point all flow through the arcuate orifices 156, 157, etc. has concluded. But flow continues through the pathway described into the chamber between pistons 199 and 201. In this position of piston 201 the port 209 continuing to the drain is blocked. Thus flow into this chamber through port 208 builds up pressure between the pistons 199 and 201 (FIG. 14). The piston 210 has passageways 262 through it thereby enabling pressure to be transmitted from the space 263 between pistons 199 and 201 to the space between pistons 201 and 202.

Movement in the first instance of pistons 198 and 199 being prevented by the overcenter mechanism 197, the pressure in the chamber 263 is transmitted through the passageways 262 into the chamber 264. The pressure in chamber 264 causes a piston 202 to move downwardly to the position shown in FIG. 14. In this position the piston 203 blocks the port 213 and the piston 204 blocks the port 215. Thus the ports necessary for brine introduction and slow backwash and the flow of brine make-up water are closed. Coincidentally the movement of downwardly of piston 203 opens the port 212 thereby establishing communication from port 212 to port 105. This supplies water pressure through conduit 103 to the meter valve 43 and enables the shifting of the rotary valves 36 and 37, if this is called for by the soft water use as determined by the meter 44.

Before the piston 205 can move downwardly from the position shown in FIG. 13 under the influence of pressure chamber 264 the water in the space underneath piston 205 has to be able to drain out through port 217 and conduit 152d. This avenue exists through conduit 152d which through a pathway already described for valve 123 connects with orifice 152 and thus through orifices 152b, 146b plate 126, orifice 146 and rectangular groove 144 to the drain aperture 143.

Since movement of piston 202 has discontinued, the existence of pressure in the chamber 263 causes the piston 199 to begin to move upwardly as between the position of FIG. 14 and the position of FIG. 10. As the piston 199 continues to move upwardly under the pressure in chamber 263 the plunger 233 begins to move upwardly against the bias force of links 228 until a central position is reached whereupon the over-center action of the device 197 causes the plunger 233 to snap upwardly into the position shown in FIG. 10. In this position of piston 199 as may be seen specifically in FIG. 10 the port 117 is closed thereby preventing flow through this port and the port 118 to the rotating valve 133. All flow to the valve 123 now stops and the parts come to rest waiting for the next call for change in the service and regenerated tank to take place.

It will be observed that the meter valve 42 is conditioned to operate because pressure is now available at the supply conduit 103. If while the regeneration of tank 33 had been taking place, the water use of tank 32 had been very high thereby causing the meter valve 42 to continue rotating, and if it has rotated far enough in this process to connect the conduit 103 with either of the conduits 101 and 102, the piston 39 would immediately shift and the regenerated tank be ready for service. There is therefore no delay in the system described because water usage has been high during the regeneration process. Other systems known to the art have the problem that if the described situation occurs a whole cycle of use of the used up tank continues before the system will initiate a regeneration.

In the removable segment 261, by varying the length of the orifice 155 relative to the orifice 154 there is enabled the adjustment of the amount of salt used in each regeneration cycle. Similarly the segment 161 in which exist the orifices 156b and 151b and the passageway 159 may involve different sizes of these components so that the amount of backwash water flow can be controlled as may be desired.

OPERATION OF TWO-WAY/ONE-WAY CAM

It will be observed in considering the operation of the piston 39 in the cylinder 41, when changing the position of the rotary valves 36 and 37, that the piston has two operating directions, one from each end of the cylinder 41 while the control cylinder 54 has, essentially, only one operating direction of actuating movement of the operating pin 232 and the plunger 233. It has, of course, a return direction, not externally functional. That is to say, the piston 39 has two directions of movement whereas the pin 232 and plunger 233 have only one direction of actuation. Accordingly a connecting link is established so that each of the two directions of movement will translate into one direction. This structure is illustrated in connection with the disclosure of FIGS. 21, 22, 23, 24 and 25. These figures may be considered in connection with FIG. 10 wherein the spur cam structure is shown and identified by the reference character 116. FIGS. 21, 22 and 23 are in effect elevational views, and the views 24 and 25 are in effect sectional views illutrating operation of the structure.

In these figures there is illustrated the stem 56 or operating rod which moves to and fro with the operation of the piston 39 operating the link 58 for actuating the rotary valves 36 and 37. The stem 56 is attached to a generally rectangular plate 265 which moves to and fro with the stem 56 and relative to a four-pronged cam 266 which is mounted independently of the stem 56 and plate 265 on its own stationary shaft 267. In order to provide space in the rectangular plate to avoid the shaft 267 if necessary a rectangular slot 268 is provided. In the figures shown the lever or operating arm 235 for the stem 232 and plunger 233 is shown. The plate 265 has a pair of parallel slots 269 and 271 therein one extending inwardly from each end of the rectangular plate. In slot 271 there is a T-shaped sliding member 272 which has an extending arm 273 connected by means of a tensile spring 274 to an abutment 275 on the rear side of the plate 265. Pivoted to the extending arm 273 there is a pawl member 276 adapted to engage the arm 277 of the cam 266. Thus referring to FIG. 21 in connection with FIG. 24 and assuming that the stem 56 is moving toward the left, the pawl 276 engages the arm 277 causing it to rotate clockwise as viewed in FIG. 21. This rotation of the cam member 266 causes the arm 278 to engage the end of lever 235.

In FIG. 24 the lower end of the T-mechanism 272 has engaged the abutting edge of pawl 276 which in turn has engaged the arm 277 of cam member 266. In FIG. 22 the stem 56 has moved substantially toward the left to the point where the end of lever 235 is about to be disengaged from the arm 278 of the cam member. The extension 273 is connected to the spring 274. Hence movement of the arm 277 by pawl 276 is resilient and without unnecessary shock, because the spring 74 extends as the plate 265 moves. But the spring 274 has sufficient tension so that the arm 277 of the cam is rotated.

In FIG. 23 the stem 56 and the rectangular plate 265 have moved as far to the left as they can and the arm 277 has pivoted to the position shown so that the adjacent side 280 is parallel to the direction of travel. Thus the pawl 276 can move parallel to the arm 277 and into its state of rest position without further contacting of the arm 277. While this process is going on as may be viewed in FIG. 25, a second T-shaped member 279 operating in parallel slot 269 is coming into operation. The T-shaped member 279 has an extension 281 connected by means of a tension spring 282 to an abutment 283 attached to the parallel plate 265. Similarly there is a pawl 284 pivoted to the extension 281. Shown in dotted lines is a representation of the arm 278 as well as of the arm 285 of the cam 266. During the rotating movement of the cam 266 as the plate 265 moves toward the left as visualized in FIGS. 21, 22 and 23, the arm 278 first engages the pawl 284 and pivots it counterclockwise (FIG. 25) causing the pawl to move upwardly and out of the way. Similarly when the arm 285 engages the pawl 284 it pivots upwardly counterclockwise and out of the way until the arm 285 occupies the position shown in FIG. 25. At this time the leading edge of the pawl 284 is in a position to engage the rear edge of the arm 285 so as to be able to move this arm toward the right which is to say clockwise thereby causing the lever arm 235 to move in the same direction as for the first operation.

In summary the control system 35 of apparatus has combined rotary plate valves 36, 37, a parallel plate meter valve 42, a control cylinder 54, a parallel plate regenerating or distributing valve 53, a pressure regulating system of valve 53, a two-way/one-way cam structure, a salt storage and brine formation container 34, a conduit system and other components into an integrated and efficient water flow operated water softening piece of equipment.

While a preferred form of the invention has been described, it is understood that this is by way of example and changes in the details of construction and the arrangement of parts may be made without departing from the spirit and scope fo the invention as hereinafter claimed.

I claim:

1. In a water softening system wherein the regenerating system includes the steps of providing flows for:
   backwashing the tank being regenerated at one and controlled rate,
   introducing a predetermined amount of brine into said tank and further backwashing at a second and slower rate,
   a second backwashing of said tank at said one rate,
   refilling a brine supply at said one rate and soaking the tank at no flow, and
   purging said tank at a third rate greater than said first rate,
   a flow operated rotating distributing valve comprising one set of stationary cemented together parallel plate members and a second set of rotatable cemented together parallel plate members, said one set of parallel plates comprising:
   a first plate for directing water flows for predetermined times and amounts and having
   a first elongated arcuate orifice at a first radius for providing initial valve operating flow,
   a second elongated orifice arcuately disposed relative to said first orifice at a second radius and of a cross-section and length, respectively, for backwash flow at said one rate and for a predetermined duration,
   a third arcuate elongated orifice arcuately disposed relative to said second orifice at said first radius and of a cross-section and length, respectively, for brine introduction and backwash flow at said second rate and for a predetermined duration,
   a fourth arcuate elongated orifice arcuately disposed relative to said third orifice at said second radius and of a cross-section and length, respectively, for a further backwash flow at said one rate and for a predetermined duration,
   a fifth arcuate elongated orifice radially disposed at a third radius less than said first and second radii and of a cross-section and length, respectively, to accommodate the flows through said second, third and fourth arcuate orifices,
   a sixth arcuate elongated orifice arcuately disposed relative to said fourth orifice at said first radius and of a cross-section and length, respectively, for said refilling of brine supply,
   a seventh arcuate elongated orifice arcuately disposed relative to said sixth orifice at said first and second radii and of a cross-section and length, respectively, for purging flow at said third rate and for a predetermined duration,
   an eighth arcuate elongated orifice radially disposed at a fourth radius less than said first and second radii and of a cross-section and length, respectively, to accommodate the flow through said seventh orifice, and
   a central passageway for accommodating the flow through any of said orifices,
   a second plate for connection to exterior components and having:
   a first orifice for flow registration with said first orifice of said first plate and of a cross-section for said initial flow,
   a second orifice for flow registration with said second orifice of said first plate and of a cross-section for flow at said one rate,
   a third orifice for flow registration with said third orifice of said first plate and of a cross-section for flow at said second rate,
   a fourth orifice for flow registration with said sixth orifice of said first plate and of a cross-section for flow at said second rate, and a fifth orifice for flow registration with said seventh orifice of said first plate and of a cross-section for flow at said third rate, and a central passageway for accommodating said flow through any of said orifices, a third plate disposed adjacent to said first plate for definition of passageways and having:

a first orifice for flow registration with said first orifice of said first plate and of a cross-section for said initial flow, a second orifice for flow registration with said second orifice of said first plate and of a cross-section for flow at said one rate, a third orifice for flow registration with said third orifice of said first plate and of a cross-section for flow at said second rate, a fourth orifice for flow registration with said fourth orifice of said first plate and of a cross-section for flow at said one rate, a fifth orifice for flow registration with said sixth orifice of said first plate and of a cross-section for flow at a refilling of said brine supply rate, a sixth orifice for flow registration with said seventh orifice of said first plate and of a cross-section for flow at said third rate, a seventh orifice for flow registration with said eighth orifice of said first plate and of a cross-section for flow at said third rate, and an eighth orifice for flow registration with said fifth orifice of said first plate and of a cross-section for flow at said second rate, and a central passageway for accommodating said flow through any of said orifices, and a fourth plate disposed between said second and third plates for further definition of passageways and having, a first orifice for flow registration with said first orifice of said first plate and of a cross-section for said initial flow, a second orifice for flow registration with said third orifice of said second and third plates and of a cross-section for flow at said second rate, a third orifice for flow registration with said fourth and fifth orifices, respectively, of said second and third plates and of a cross-section for flow at a refilling of said brine supply rate, a fourth orifice for flow registration with said fifth and sixth orifices, respectively, of said second and third plates and of a cross-section for flow at said third rate, a fifth orifice for flow registration with said eighth orifice of said third plate and of a cross-section for flow at said second rate, a passageway connecting the fourth and fifth orifices of said fourth plate and of a cross-section for predetermined flow at said second rate, a sixth orifice, arcuate in nature for flow registration with the second, fourth, and seventh orifices of said third plate and of a cross-section for flow at said third rate, and a central passageway for accommodating said flow through any of said orifices, said second set of parallel plates comprising:

a first plate for directing water flows in predetermined amounts from one side thereof being disposed with its other side against the exposed side of the first plate of said first set and having:

a first orifice at a radius equal to said first radius of said first plate of said first set for flow registration with said first, third, sixth and seventh orifices of said first plate of said first set and of a cross-section for flows at said initial, third, and brine refill rates, orifice means at a second radius equal to said second radius of said first plate of said first set for flow registration with said second, fourth and seventh orifices of said first plate of said first set and of a cross-section for flows at said second rate, a central passageway communicating with the central passageways of the first, second, third and fourth plates of said first set, and a radially extending groove connecting with said central passageway and having a radial extent less than the first radius of said first plate of said second set but sufficient to reach the fifth and eighth grooves of the first plate of said first set and having a cross-section for flows at said third rate, a second plate disposed against said one side of said first plate and having:

a radius to cover said radial extension of said first plate but leaving exposed said orifice and orifice means of said first plate, means for supplying fluid to said one side of said first plate, and means for rotating said second set of plates.

2. The water softening system according to claim 1 wherein the orifice means of the first plate of said second set comprises two arcuately disposed orifices of a cross-section greater than that of the first orifice of said first plate.

3. The water softening system according to claim 1 wherein said rotating means comprises pawl and ratchet mechanism associated with said second plate.

4. The water softening system according to claim 3 wherein said rotating means further comprises a hollow shaft extending through the central passageways of said first and second sets of parallel plates and attached to the pawl of said pawl and ratchet mechanism.

5. The water softening system according to claim 4 wherein said pawl and ratchet mechanism comprises an interiorly toothed ring attached to said second plate of said second set, said pawl engages the teeth of said toothed ring, pivot means for said pawl and spring bias means for said pawl whereby said set of plates may be manually rotated without rotation of said hollow shaft.

6. The flow operated distributing valve according to claim 1 wherein said third arcuate elongated orifice and said sixth arcuate elongated orifice comprise a replaceable segment of said first plate.

7. The flow operated distributing valve according to claim 1 wherein said fourth orifice and said fifth orifice and the passageway connecting the same comprise a replaceable segment of said fourth plate.

8. In a water softening system adapted to be connected between a hard water supply line and a user service line including a pair of tanks one of which is adapted for regeneration while the other is adapted for service, and vice-versa, and a salt storage and brine formation tank, water operated automatic control apparatus comprising:

a first parallel plate valve means rotatably having a first position and a second position, respectively, for connecting the first of said tanks from the hard water supply line to the user service line, connecting the second of said tanks for regeneration, and vice-versa, a soft water use metering device connected in said user service line, a first cylinder and two-way operating piston therein for shifting said first parallel plate valve means from said first to said second position and vice-versa, a first mechanical link from said operating piston to said first parallel plate valve means, a second parallel plate valve means which is rotatable for supplying operating pressure in succession for each way of said operating piston, a driving connection from said metering device to said second parallel plate disk valve means for rotation thereof in response to soft water use, a third parallel plate valve means for controlling the sequence of regeneration steps in the tank being regenerated following each shift of said first parallel plate valve means, one of the plates of said third parallel plate valve means being rotatable under the influence of soft water pressure from said user service line for causing soft water flow including in succession initiation, rapid backwash, brine injection and backwash, further rapid backwash, brine forming, and purging, control valve means including a second cylinder, first, second, third, and fourth pistons therein, and means for actuating said pistons, a first line forming a drain from said third parallel plate valve means, said first piston being in said first line for controlling said drain, said first piston having an initial position closing said first line and a second position opening said first line, a second line for supplying soft water pressure from said user service line to said third parallel plate valve means, said second piston being in said second line for controlling flow of soft water therein, said second piston having an initial position closing said second line and a second position opening said second line, a second mechanical link from said operating piston to said first piston and said second piston to actuate same, respectively, in one direction to their said second positions after each operation of said operating piston, thereby initiating rotation of said one plate of said third parallel plate valve means, said rotation continuing as soft water flow continues through said third parallel plate valve means producing said sequence of regeneration steps, a third line for supplying soft water pressure from said user service line to said second parallel plate valve means, said third piston being in said third line for controlling the flow of soft water therein, said third piston having an initial position opening said third line and a second position closing said third line, means including a fourth line from said third parallel plate valve means to said second cylinder for actuating said third piston to its said second position after said initiation, thereby blocking said third line and preventing further rotation of said second parallel plate valve means and consequent further action of said operating piston during a particular regeneration cycle, brine line means running from said third parallel plate valve means to said first parallel plate valve means, a connection from said brine line means to said brine forming tank for supplying brine and backwash water to the one of said first and second tanks under regeneration, means in said second cylinder including said third piston in its said second position for opening said connection to said brine forming tank at the time of actuating thereof to its said second position, a brine water refill line running from said third parallel plate valve means to said salt storage and brine forming tank, said fourth piston being in said brine water refill line for controlling the supply of soft water therein, said fourth piston having an initial position closing said refill line and a second position opening said refill line, said fourth piston being actuated to its said second position by the actuating means of said third piston at the time of actuating of said third piston to its said second position, purge lines means running from said third parallel plate valve means to said first parallel plate valve means and therefrom back to said third parallel plate valve means and to a drain therein for conducting purge water flow to and from the tank being regenerated, a reset line comprising said first line running from said third parallel plate valve means to said first piston, said first piston in its said initial position closing said reset line and in its said second position opening said reset line, said first piston being further actuated to its said first position in response to movement of said third piston to its second position whereby continuation of pressure from said third parallel plate valve means through said reset line actuates said third and fourth pistons and said second piston to respective initial positions, and rotation of said one of said plates of said third parallel plate valve means determining the respective times of backwashing, brine injecting and backwashing, brine forming and purging.

9. The water operated automatic control apparatus according to claim 8 wherein said second mechanical link comprises mechanism for actuating said first and second pistons in one direction from their said first positions to their second positions irrespective of movements of said operating piston in two directions.

10. The water operated automatic control apparatus according to claim 9 including water turbine means responsive to flow in said line for rotating said one of the plates of said third rotatable plate valve means.

11. The water operated automatic control apparatus according to claim 10 including pressure regulating means for stabilizing the pressure of the regeneration water.

12. The water operated automatic control apparatus according to claim 9 wherein said second mechanical link comprises a four radial arm cam member, a fixed pivot for said cam member, an actuating plate having a central slot receiving said pivot enabling longitudinal movement of said plate relative to said plate and said pivot, said plate being connected to said operating piston for actuation thereby, a link disposed between said radial arms and said first and second pistons of said control cylinder for operation of said pistons by the rotation of said radial arms, and a pair of one-way operating mechanisms mounted on said actuating plate, one of said one-way operating mechanism engaging said radial arm cam member in one direction for one direction of said actuating plate, and the other of said one-way operating mechanism engaging said radial arm cam in said other direction for the other direction of said actuating plate.

13. The pair of one-way operating mechanism according to claim 12 wherein the first of said one-way operating mechanisms comprises a first slidable member mounted on said actuating plate on one side of said pivot, a first pawl pivotably mounted on said first slidable member for engaging one of the arms of said radial arm cam in one direction of said actuating plate, and spring means for cushioning movement of said first slide member, and wherein the second of said one-way operating mechanisms comprises a second slidable member mounted on said actuating plate on the other side of said pivot, a second pivotably mounted on said second slidable member for engaging a second and oppositely disposed one of the arms of said radial arm cam in the other direction of said actuating plate, and spring means for cushioning movement of said second slide member.

14. The water operated automatic control apparatus according to claim 9 wherein the mechanism for actuating said first and said second pistons includes a first stem connected to said first piston, a second stem connected to said second piston, and an overcenter device for actuating said second piston.

15. The water operated automatic control apparatus according to claim 8 wherein said third parallel plate valve means comprises a stationary plate means having a series of arcuately disposed orifices in one face and a series of exterior orifices communicating with said arcuately disposed orifices, a rotatable plate means having a second face disposed closely adjacent and parallel to said one face, said second face having orifice means for communicating with said arcuate orifices as said rotatable plate means rotates, a chamber surrounding said stationary and said rotatable plate means for supplying soft water pressure to the exposed side of said rotatable plate means, spring means associated with said rotatable plate means for biasing said second face of said rotatable plate means away from said one face of said stationary plate means against said soft water pressure, conduit means for conducting soft water flow from said water turbine means to said chamber, and means associated with said water turbine means to vary said soft water flow in said conduit means response to the degree of friction between said one and said second faces.

16. The water operated automatic control apparatus according to claim 15 wherein said flow varying means comprises a first chamber adapted to be rotated by said water turbine, first apertures in said first chamber for conducting said soft water flow, a second chamber interiorly of said first chamber and having second apertures for receiving said soft water flow from said first apertures, a driving connection between said second chamber and said first plate means, said soft water flow from said second apertures being conducted through said conduit means, and spring means connecting said first and said second chambers whereby rotation of said first chamber rotates said second chamber and varying resistance to the rotation of said rotatable plate means varies the effective apertures size formed by said first and second apertures.

17. The water operated automatic control apparatus according to claim 16 wherein said driving connection comprises a hollow shaft for conducting said soft water flow and a pawl and ratchet mechanism connected between said hollow shaft and said rotating plate means.

18. The water operated automatic control apparatus according to claim 17 including an external yoke attached to rotating plate means for manually rotating same.

19. The water operated automatic control apparatus according to claim 8 wherein said first parallel plate valve means comprises, stationary plate means having a series of arcuately disposed service and arcuate regeneration orifices in one face and a series of exterior orifices communicating with said service and regeneration disposed orifices, a rotatable plate means having a generally semi-circular face disposed closely adjacent and parallel to said one face, said second face having an arcuate passageway disposed essentially parallel to the boundry diameter of said semi-circular face, said arcuate orifice having an arcuate extent sufficient to span from said regeneration orifice to one of said service orifices in one position and from said regeneration orifice to another of said service orifices in a second position, and a cover over said stationary and said rotatable plate means for defining a passageway from one service orifice to either of the other service orifices determined by the rotatable position of said rotatable plate.

20. The water operated automatic control apparatus according to claim 19 wherein said stationary plate means comprises one plate having a series of arcuately disposed service and arcuate regeneration orifices therethrough and a second plate having a series of orifices therethrough communicating with said service and regeneration orifices and cemented to said one plate, and wherein the arcuate passageway in said rotatable plate means comprises an arcuate groove therethrough and including a second semicircular plate cemented to said rotatable plate.

21. In a water softening system adapted to be connected between a hard water supply line and a user service line including a pair of tanks one of which is adapted for regeneration while the other is adapted for service, and vice-versa, and a salt storage and brine formation tank, a parallel plate valve system for controlling the service and regeneration cycles of said pair of tanks comprising
- a first parallel plate valve means having a stationary plate and a movable plate having a first position and a second position,
- a second parallel plate valve means having a stationary plate and a movable plate having a first position and a second position,
- the stationary plate of said first parallel plate valve means having an input orifice for receiving hard water for softening,
- the stationary plate of said second parallel plate valve means having an output orifice for dispensing soft water to user service,
- the stationary plate of said first parallel plate valve means having two service orifices, one for connection to said service tank at the upper end thereof and the other for connection to said regeneration tank at the upper end thereof,
- the stationary plate of said second parallel plate valve means having two service orifices, one for connection to a conduit extending to the bottom of said service tank and the other for connection to a conduit extending to the bottom of said regeneration tank,
- the stationary plate of said first parallel plate valve means having a brine, backwash, and purge water orifice for connection to either of its service orifices,
- the stationary plate of said second parallel plate valve means having a brine, backwash, and purge water orifice for connection to either of its service orifices,
- the movable plate of said first parallel plate valve means and the movable plate of said second parallel plate valve means being operable together for connecting, in said first positions thereof, said input orifice to said one service orifice of the stationary plate of said first parallel plate valve means, and from said brine, backwash, and purge water orifice of the stationary plate of said first parallel plate valve means to said other service orifice of the stationary plate of said first valve means, and said output orifice to said one service orifice of said stationary plate of said second parallel plate valve means, and from said brine, backwash, and purge water orifice of the stationary plate of said second parallel plate valve means to said other service orifice of the stationary plate of said second parallel plate valve means, and for connecting in said second positions thereof said input orifice to said other service orifice of the stationary plate of said first parallel plate valve means, and from said brine, backwash, and purge water orifice of the stationary plate of said first parallel plate valve means to said one service orifice of the stationary plate of said first parallel plate valve means, and said output orifice to said other service orifice of the stationary plate of said second parallel plate valve means, and from said brine, backwash, and purge water orifice of the stationary plate of said second parallel plate valve means to said one service orifice of the stationary plate of said second parallel plate valve means.

22. The parallel plate valve system according to claim 21 wherein said first parallel plate means comprises stationary plate means
- said stationary plate of said first parallel plate valve means comprises a first stationary member having the input, service, and brine, backwash, and purge water orifices therein and a second stationary member cemented to said first stationary member and having corresponding orifices therein of which said brine backwash and purge water orifice comprises an arcuate slot,
- said movable plate of said first parallel plate valve means comprises a generally semi-circular plate member having an arcuate slot therethrough of an extent to span from either of the service orifices of the stationary plate of said first parallel plate valve means to the brine, backwash and purge water orifice thereof, said arcuate slot being opposite to and generally parallel to the semi-diameter of said movable plate member and a second semi-circular plate member cemented to said first semi-circular plate member, said semi-circular form enabling the connection of said input orifice and either of said service orifices,
- said stationary plate of said second parallel plate valve means comprises a first stationary member having the input, service, and brine, backwash and purge water orifices therein and a second stationary member cemented to said first stationary member and having corresponding orifices therein of which said brine backwash and purge water orifice comprises an arcuate slot,
- said movable plate of said second parallel plate valve means comprises a generally semi-circular plate member having an arcuate slot therethrough of an extent to span from either of the service orifices of the stationary plate of said second parallel plate valve means to the brine, backwash and purge water orifice thereof, said arcuate slot being opposite to and generally parallel to the semi-diameter of said movable plate member and a second semi-circular plate member cemented to said second semi-circular plate member, said semi-circular form enabling the connection of said input orifice and either of said service orifices,
- said movable plates being connected together and means connected to the operating cylinder for actuating said connected movable plates from a first to a second position.

\* \* \* \* \*